(12) United States Patent
Asakura et al.

(10) Patent No.: US 6,573,615 B1
(45) Date of Patent: Jun. 3, 2003

(54) ELECTRONIC KEY SYSTEM FOR A VEHICLE

(75) Inventors: Suguru Asakura, Saitama (JP); Akira Nagai, Saitama (JP); Yoshikazu Imura, Saitama (JP); Kentaro Yoshimura, Saitama (JP); Munehisa Nozawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 112 days.

(21) Appl. No.: 09/662,907

(22) Filed: Sep. 15, 2000

(30) Foreign Application Priority Data

Sep. 29, 1999 (JP) ............................................. 11-276267

(51) Int. Cl.⁷ ............................................. B60R 25/00
(52) U.S. Cl. ...................... 307/9.1; 307/10.2; 307/10.3; 307/10.5; 307/10.6
(58) Field of Search ................................ 307/9.1, 10.5, 307/10.6, 10.3, 10.2; 70/237, 252

(56) References Cited

U.S. PATENT DOCUMENTS

| 4,893,240 A | * | 1/1990 | Karkouti ................. 364/424.05 |
| 5,641,999 A | * | 6/1997 | Kawashima ................ 307/10.3 |
| 5,656,867 A | * | 8/1997 | Kokubu ...................... 307/10.5 |
| 5,909,918 A | * | 6/1999 | Kowalewski et al. ....... 292/199 |
| 5,977,655 A | * | 11/1999 | Anzai ........................ 307/10.3 |

FOREIGN PATENT DOCUMENTS

| DE | 41 05 113 | * | 8/1992 | .......... H01H/27/06 |
| JP | 63-39069 | | 3/1988 | |
| JP | 3-21575 | | 1/1991 | |
| JP | 5-106376 | | 4/1993 | |
| JP | 8-133019 | | 5/1996 | |
| JP | 9-250265 | | 9/1997 | |
| JP | 10-25939 | | 1/1998 | |
| JP | 10-287208 | | 10/1998 | |
| JP | 10-297434 | | 11/1998 | |
| JP | 11-2051 | | 1/1999 | |
| JP | 11-36675 | | 2/1999 | |
| JP | 11-091460 | | 4/1999 | |

* cited by examiner

Primary Examiner—Brian Sircus
Assistant Examiner—Robert L DeBeradinis
(74) Attorney, Agent, or Firm—Armstrong, Westerman & Hattori, LLP

(57) ABSTRACT

The present invention provides an electronic key system for a vehicle which is a type of starting the engine with pressing a button switch and can be operated at familiar mechanical movements thus easing the user or driver of an unfamiliar conception as well as improved in the operability and the protection against theft.

When a quick-start switch mounted on the steering wheel is pressed after the code identification is valid, a CPU switches on the start switch to energize a starter motor. The CPU judges from a change in the voltage of an alternator that the engine starts running. As the engine runs, an ignition switch is automatically turned to the II position with a valet key inserted. The engine can be stopped by the valet key turning to the 0 position. In the parking state, the valet key may be detached from or accommodated in the ignition switch.

8 Claims, 22 Drawing Sheets

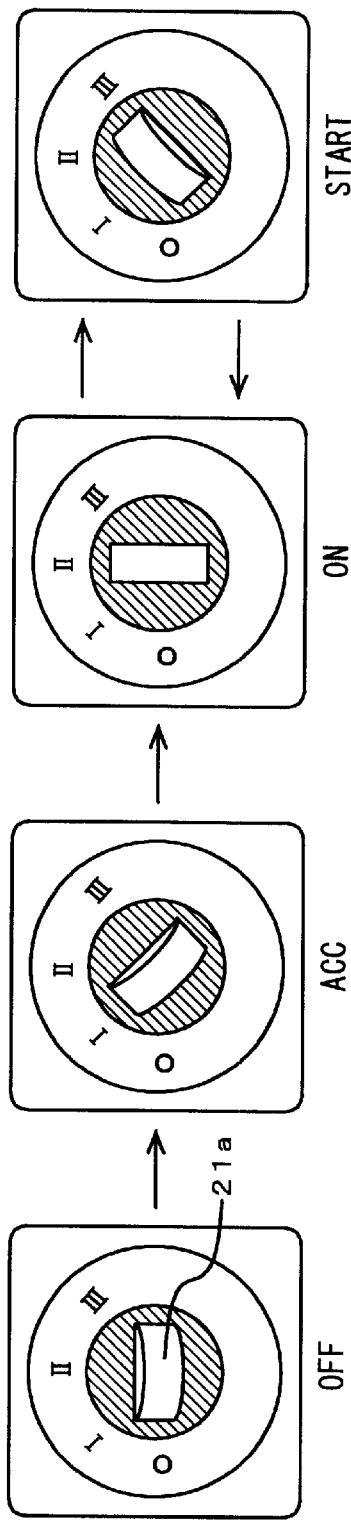
Fig. 26A (MANUAL START OPERATION)
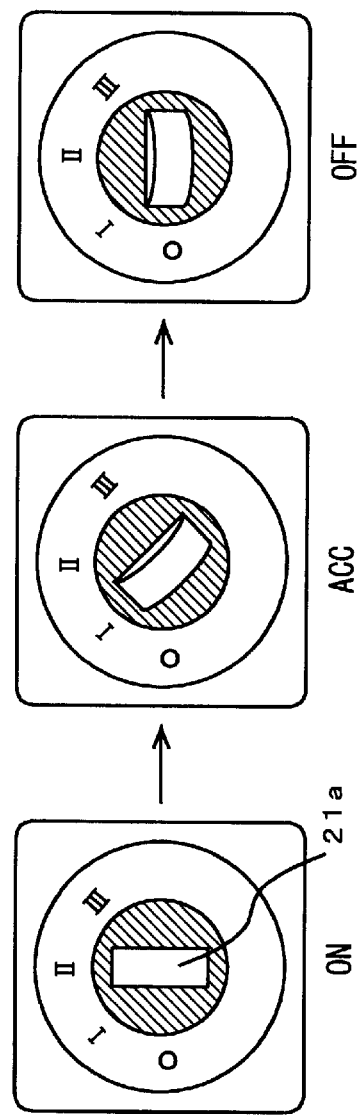
Fig. 26B (STOP OPERATION OF ENGINE)

ELECTRONIC KEY SYSTEM FOR A VEHICLE

BACKGROUND OF THE INVENTION

1. Field of the Invention

The present invention relates to an electronic key system for a vehicle and particularly, to a remote control system for automatically locking and unlocking the door(s) of a vehicle in radio control. More particularly, it relates to an electronic key system for a vehicle for use with a remote control system for automatically locking the door(s) of the vehicle when the user (the driver) carrying an electronic or entry key (equipped with a portable transmitter/receiver) assigned with a specific code dedicated to the vehicle departs a predetermined distance from the vehicle and automatically unlocking the door(s) when he or she steps in the distance from the vehicle, characteristically arranged for starting and stopping the engine of the vehicle with giving the user or driver no unfamiliar feeling.

2. Description of the Related Art

Conventional key systems include a type for inserting and turning a mechanical key, which serves as the ignition key, in a key cylinder to unlock the door of a vehicle and a type for locking and unlocking the door by a remote control key which also serves as the ignition key and has a button switch provided on a knob thereof for transmitting a key specific code towards a key cylinder of the door for allowing the vehicle to identify the code.

However, an increasing number of vehicle have been stolen regardless of such conventional key systems. As the mechanical arrangements or key cylinders of the conventional key systems may easily be broken, they tend toward to be replaced by any electronic door locking arrangement operated through code identification in a radio transmission system.

For example, some of such conventional "welcome function" based electronic key system for vehicle doors are disclosed in Japanese Patent Laid-open Publications (Heisei)5-106376 and (Heisei)10-25939, in which a transmitter mounted on a vehicle is provided for intermittently transmitting a response demand signal having a predetermined communication area and, when receiving a signal responding to the response demand signal from an entry key which is carried by the user of a vehicle and moves into the predetermined communication area, determining whether the response signal is valid (regular) or not (welcome code examination). When the response signal has been determined to be valid, the door(s) of the vehicle is automatically unlocked. On the contrary, when the response signal is not valid or when the entry key stays out of the predetermined communication area and the vehicle-mounted transmitter receives no response signal, the door remains locked.

Accordingly, when the user of the vehicle carrying the entry key simply walks away from the predetermined range of the vehicle, the door of the vehicle can automatically be locked without paying any attention to or operating the entry key. When the user comes into the range, the door can automatically be unlocked. This requires no boresome actions of unlocking the door for riding the vehicle as well as contributes to the prevention of failing to lock door(s), and of vehicle theft.

Such electronic key systems are more difficult in fabricating their copies than the conventional mechanical key systems and provide automatic locking with electrically driven movements and can hence be significantly improved in the protection against vehicle theft.

While the engine is commonly started by inserting and turning a key in the ignition key cylinder, a card-like electronic key may be used for addressing the code identification in combination with a push-button start switch which is switched on when the code identification is valid to start the engine. Such a characteristic system is disclosed in Japanese Patent Laid-open Publication (Heisei)3-21575. As the engine can be started by pressing the button switch, known troublesome actions including recognizing the position of the ignition key cylinder into which an ignition key is inserted, inserting the ignition key into the ignition key cylinder, and turning the ignition key maybe eliminated. Accordingly, the start of the engine will be much facilitated.

However, since the use of the push-button switch for starting the engine may annoy a considerable number of users or drivers with giving an unfamiliar feeling, a favorable improvement in the push-button switch starting system will be desired for gaining the popularity.

SUMMARY OF THE INVENTION

It is an object of the present invention, in view of the above aspects of the prior art, to provide an electronic key system for a vehicle of a type for starting the engine by pressing a button switch, particularly which is operable at the mechanical movements thus easing the user or driver of an unfamiliar feeling and can be improved in the operability and the protection against vehicle theft.

As a first feature of the present invention, an electronic key system for a vehicle arranged to control the action of vehicle-mounted apparatuses through code identification based on radio communications with a portable electronic key comprises a means for determining whether the code identification is valid or not, a start switch operated to be turned on for starting an engine of the vehicle when the determining means determines that the code identification is valid, a rotary switch accompanied with a manually operated knob and arranged for controlling the action of vehicle-mounted apparatuses according to the position of the rotary switch, and an auto-turn mechanism arranged to automatically turn the rotary switch to a position for enabling the action of the vehicle-mounted apparatuses when the code identification is valid.

As a second feature of the present invention, the electronic key system comprises an auto-turn mechanism arranged to automatically turn the rotary switch to a position for enabling the action of the vehicle-mounted apparatuses when the code identification is valid and the start switch is turned on.

According to the first and second features of the present invention, the engine can be started by simply pressing the button (switch) and stopped by the same familiar mechanical movement as with a conventional ignition key. As a result, the key system allows the user or driver to operate with having no unfamiliar feeling and can be improved in the operability and the protection against vehicle theft. Also, according to the first feature, the period for starting the engine can be minimized, hence improving the operability.

As a third feature of the present invention, the electronic key system comprises a mechanism for physically locking the manually operated knob for the rotary switch, wherein when the rotary switch is held to the position for disabling the action of the vehicle-mounted apparatuses and the code identification is valid, the manually operated knob is unlocked and separated from the rotary switch.

According to the third feature of the present invention, the manually operated knob is portable and can replace a main portable electronic key, for example, which has a fault. As a result, the key system can eliminate inconvenience caused by the fault, thus improving in the utility.

As a fourth feature of the present invention, the electronic key system comprises while the manually operated knob has a transmitter for transmitting a second code, a receiver for receiving the second code, wherein a combination of the identification of the second code and the turning action of the manually operated knob can enable the action of the vehicle-mounted apparatuses.

According to the fourth feature of the present invention, the engine or the vehicle-mounted apparatuses can be enabled by inserting and turning the manually operated knob to the relevant positions in the rotary switch after the identification of the second code is valid. In any emergency case, the manually operated knob can act as a valet key identical to the conventional ignition key, thus improving the utility of the system. Also, the action of the vehicle-mounted apparatuses is enabled by a combination of the code identification and the turning movement of the manually operated knob, whereby the system can highly be improved in the protection against vehicle theft.

As a fifth feature of the present invention, the electronic key system comprises a parking state detecting means for detecting a parking state of the vehicle, and a retracting mechanism for retracting the manually operated knob inwardly of a key cylinder of the rotary switch, wherein the manually operated knob can be released from the retracting mechanism and projected from the key cylinder when the code identification is valid and can be retracted inwardly of the key cylinder by the action of the retracting mechanism when the engine stops and the parking state is detected.

According to the fifth feature of the present invention, the manually operated knob when is kept in the vehicle can be addressed inwardly and accommodated deep in the key cylinder. This prevents the manually operated knob from being accessed by any other personnel and can hence improve the protection against vehicle theft.

BRIEF DESCRIPTION OF THE DRAWINGS

FIGS. 26A and 26B are views showing turning movement of the manually operated knob for automatically starting and stopping the engine;

DETAILED DESCRIPTION OF THE PREFERRED EMBODIMENTS

Figure 1:
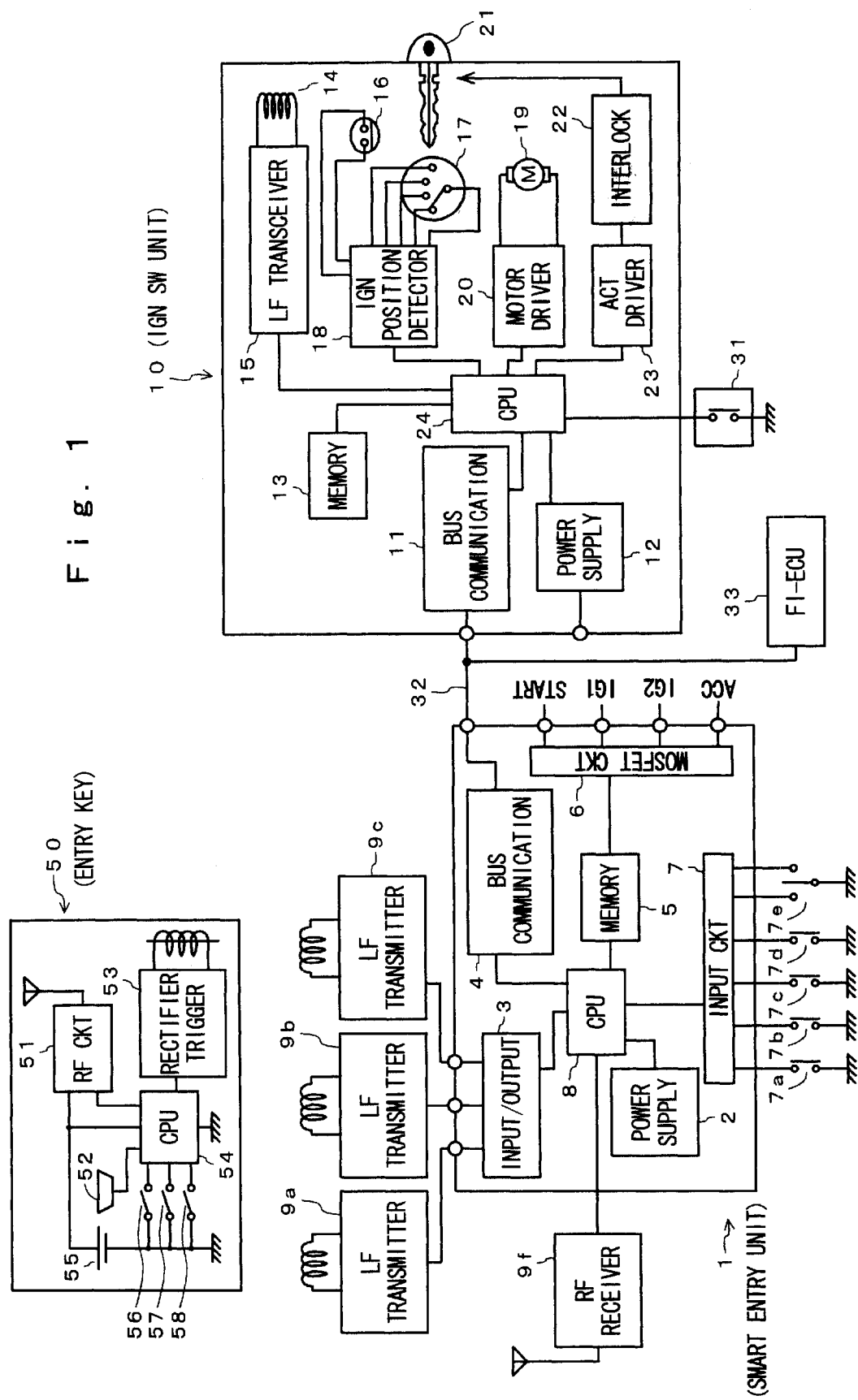
FIG. 1 is a block diagram showing a schematic arrangement of a smart entry system of the present invention.

An entry key system for a vehicle according to first embodiment of the present invention will be describe in more detail referring to the accompanying drawings. Before starting the main description, some definitions on the flags at 1 of the bit and the timers employed in the description and the drawings are explained as listed below.

AREC=reception of A code;
ATM=transmission of A response demand signal;
BCHG=start of examining the shift from small B response demand signal to large B response demand signal;
BLTM=transmission of large B response demand signal;
BREC=reception of B code;
BSTM=transmission of small B response demand signal;
CAUT=enabling the action of a pop-up mechanism in a rotary switch;
EM=emergency mode;

I(variable)=the number of consecutive receptions of A code;
IMBF=result of the preceding immobilizing check;
IMCHK=start of immobilizing checkup;
IMDONE=finish of immobilizing checkup;
IMOK=result of immobilizing checkup;
ISR=fault detection being under way;
m(variable)=setting in timer T-OUT;
MOD(n,m)=remainder of n/m;
MU=manual code priority controlling being under way;
n(variable)=setting for the kind of response demand signals to be transmitted;
OUT=the entry key is out of communication area for A response demand signal;
RCHK=timer T-OUT has started for examining the entry key is not near about vehicle;
RF1/2=finish of refresh procedure 1, 2, respectively;
SRCH=completion of fault detection;
STMOT=enabling the action of a quick-start switch and permitting the action of an auto-turn mechanism;
T-BCHG=timer for setting exchange of B response demand signals;
T-IMCHK=timer setting time for immobilizing checkup;
T-OUT=timer setting time for judging that the entry key is out of communication area for A response demand signal;
T-MU=timer for setting door lock control priority period with manual code;
VLK=withdrawn of a valet key in emergency mode;
VKLK=enabling release of interlocking;
Response demand signal timer interruption permitting bit= permitting timer interruption for transmission of response demand signal;
Valet key switching off interruption bit=permitting interruption on valet key switching off.

A first embodiment of the present invention will be described in the form of a remote control system for a vehicle referring to the block diagram of FIG. 1.

A smart entry unit 1 comprises a power supply circuit 2 such as a battery equipped on the vehicle, an input/output circuit 3 connected to LF (low frequency) transmitter circuits 9a to 9c, a bus communication circuit 4 connected by a communication line 32 to an ignition SW unit 10 which will be described later, a memory circuit 5, an MOSFET circuit 6, an input circuit 7, and a CPU 8 connected to above-mentioned circuit components for controlling their actions. The CPU 8 is further connected to an RF receiver circuit 9f.

The input circuit 7 is connected with a manual switch 7a responsive to the manual code transmitted by a manual operation of the entry key 50, described later, for setting the manual mode, a number of door lock switches 7b for detecting the locking and unlocking of the corresponding number of the doors, the same number of door switches 7c, an engine hood switch 7d, a door key cylinder switch 7e, and a trunk switch 7f. The door switches 7c, the engine hood switch 7d, and the trunk switch 7f are switches for detecting the opening and closing actions of doors, the engine hood and the trunk. The door key cylinder switch 7e detects the turning of the door key cylinder either to the lock side or to the unlock side.

The entry key 50 which is usually carried and manipulated by a driver or user of the vehicle comprises an RF circuit 51 for transmitting an RF signal from an antenna, an alarm/display 52 such as a buzzer, a rectifier trigger (TRIG) circuit 53 for processing LF signals received which are transmitted from the LF transmitter circuits 9a to 9c, a CPU 54, a battery 55, manual switches 56 and 57 for transmitting manual codes for manually locking and unlocking the door, and a switch 58 for allowing/prohibiting the manual operation. The switches 56 and 57 may be modified into a single switch for repeating alternately the lock and unlock actions.

The ignition SW unit 10 comprises a bus communication circuit 11 for exchanging signals via the communication line 32 with the smart entry unit 1, a power supply circuit 12, a memory circuit 13, an immobilizing (anti-thief functioning) antenna 14, a low frequency (LF) transmitter/receiver circuit 15, a key SW 16 for detecting the insertion/extraction of a valet key, an ignition (IGN) SW 17, an IGN position detector 18 for detecting the contact position of the IGN SW 17, a motor 19 for actuating a rotary contact of the IGN SW 17, a motor driver 20 for driving the motor 19, a valet (or emergency) key 21 which is inserted and extracted to and from the key cylinder, an interlock ACT (actuator) 22 for prohibiting the removal (or extraction) of the valet key 21, an ACT driver 23 for driving the interlock ACT 22, and a CPU 24 for controlling the actions of the above-mentioned components. The CPU 24 is also connected to a quick start SW 31 for starting the engine.

Figure 2:
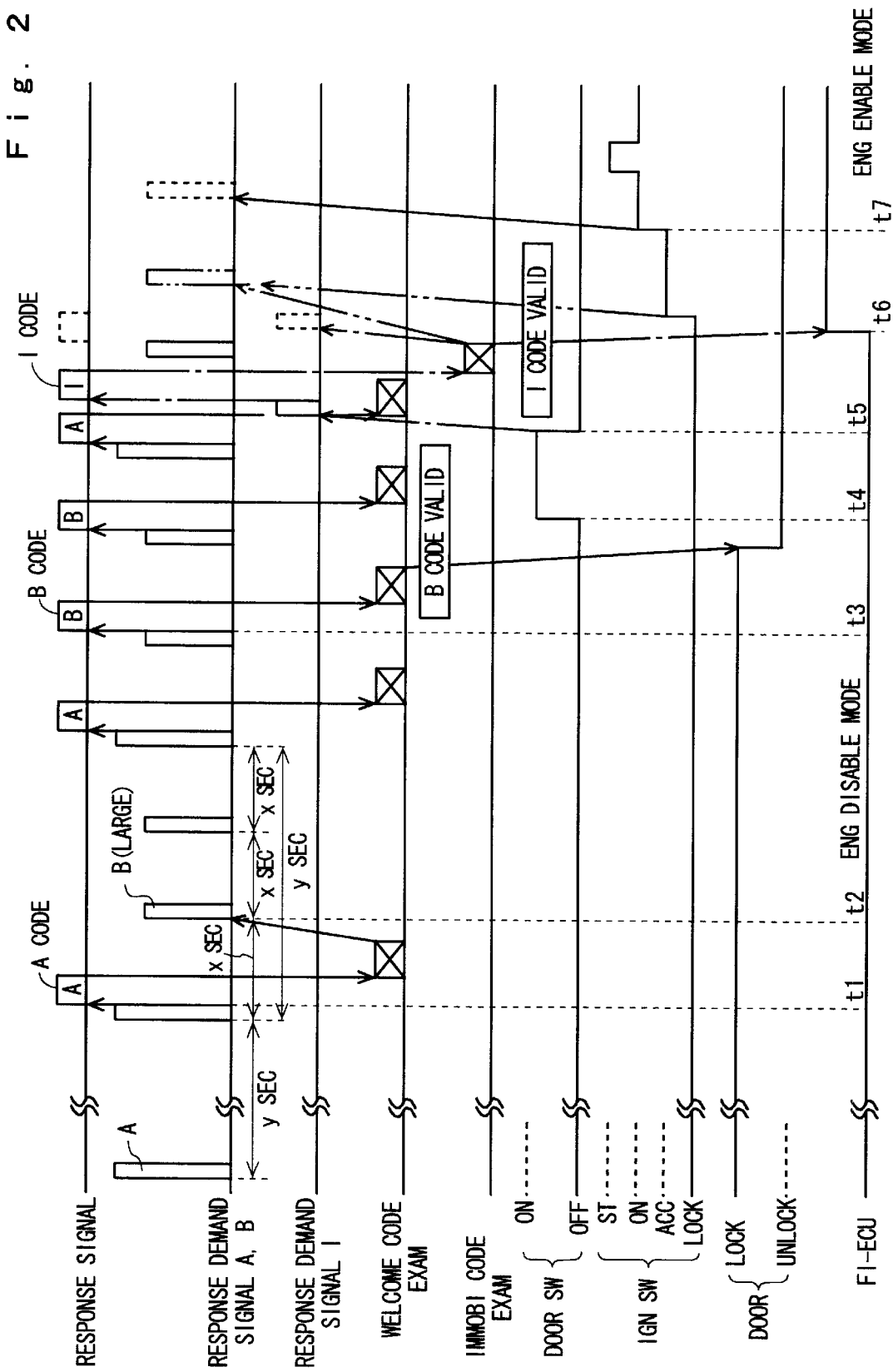
FIG. 2 is a timing chart of actions showing schematically the relation between a smart entry unit and an entry key (coming close to each other)
Figure 3:
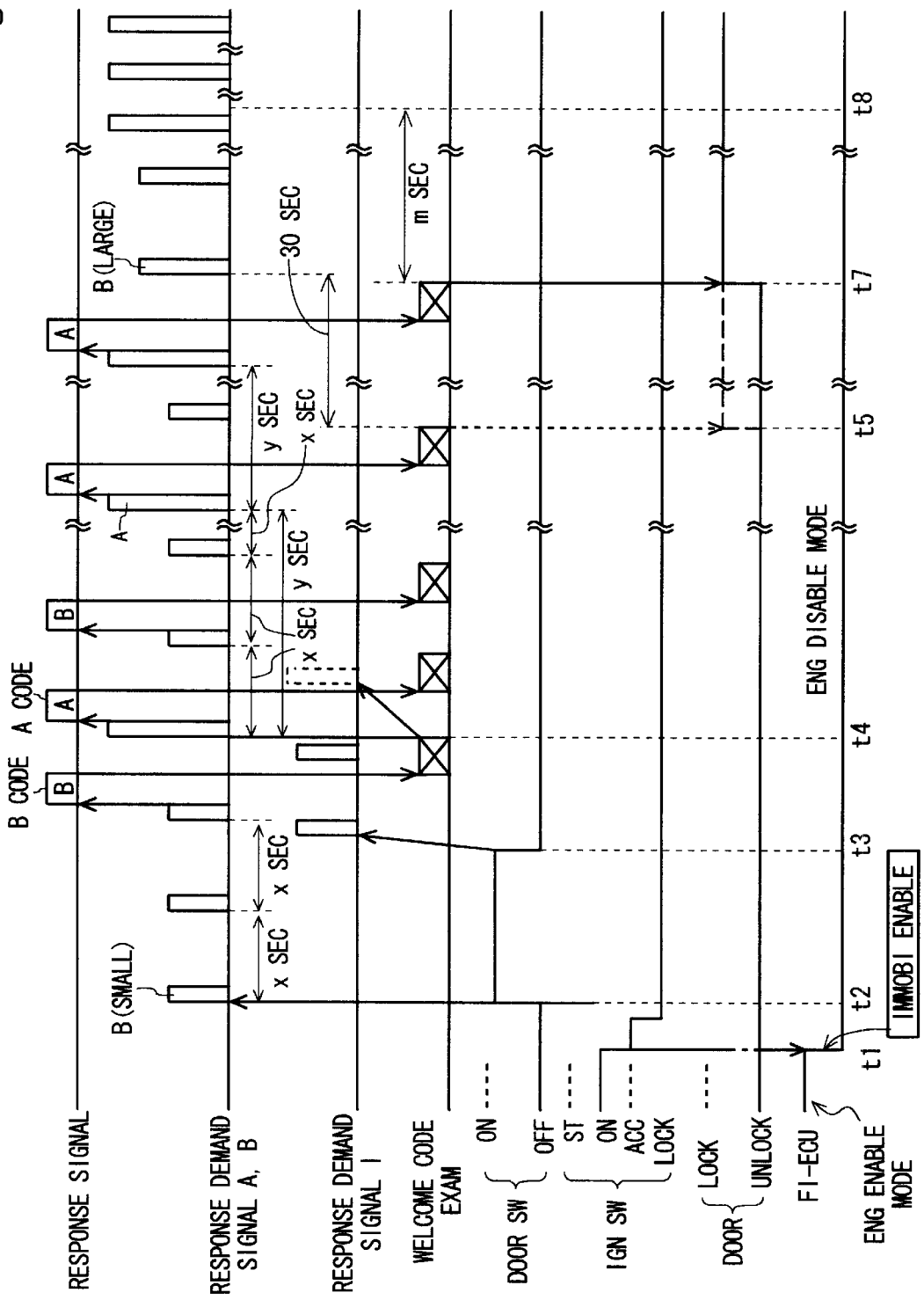
FIG. 3 is a timing chart of actions showing schematically the relation between the smart entry unit and the entry key (departing from each other)
Figure 17:
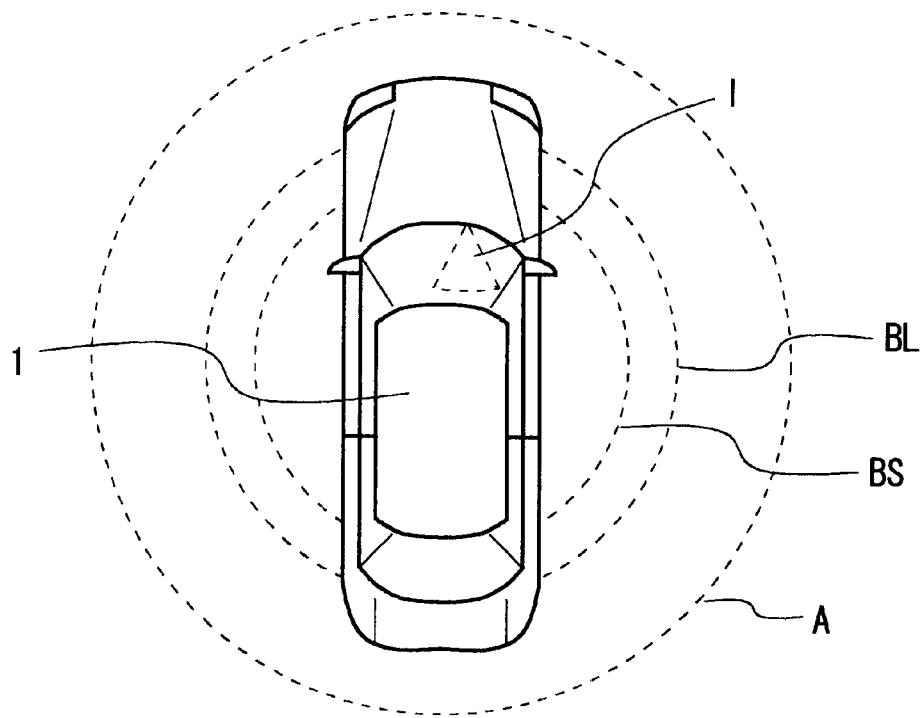
FIG. 17 is a schematic view showing the relation between the distance from the vehicle to the entry key and its relevant controlling action.

The operation of the smart entry unit 1 and the entry key 50 will schematically be described referring to the timing charts of FIGS. 2 and 3 and the schematic view of FIG. 17. FIGS. 2 and 3 illustrate the welcome function in which the door of the vehicle is unlocked and locked in response to the detection of the user carrying the entry key 50 (who may hence be simply referred to "entry key" hereinafter) coming close to the vehicle 1 for boarding and leaving from the vehicle 1 after getting off, respectively. In these figures, the height of the bars of the response demand signals represents the intensity of the signals thus indicating the size of the communication area (receivable range).

When the entry key is outside of and distanced significantly from the vehicle of which the door remains locked in a disembark or parking mode, an A response demand signal (of e.g. 100 kHz) shown at the left side end in FIG. 2 is transmitted from the vehicle at equal intervals of a first predetermined time (y seconds) and with an intensity corresponding to the maximum communication area (for example, 4 to 5 meters in radius) denoted by A in FIG. 17. As the driver carrying the entry key moves into the communication area A for the A response demand signal, the entry key receives the A response demand signal at the moment t1 and transmits a send-back signal or a response signal responding to the A response demand signal which includes an A code and may be referred to as "A code" hereinafter. The format of the response signal will be explained later in more detail referring to FIGS. 18A and 18B.

The vehicle, when receiving the response signal and judging that the response signal received is valid, releases a large-area B response demand signal (e.g. of 300 kHz and having a one-meter-radius communication area denoted by B (large) in FIG. 17) from t2 at equal intervals of a second predetermined time (x seconds). It is assumed y>x or more specifically, y=3x in this embodiment. Upon receiving the B large response demand signal at t3, the entry key 50 releases a response signal which includes a B code and may be referred to as a "B code" hereinafter. When it is judged that the response signal including the B code is valid, the door of the vehicle is unlocked.

As the door is opened at t4 (door SW is on) and then closed at t5, it is determined that the driver has embarked and an I (immobilizing) response demand signal designated its communication area as in the interior of the vehicle is transmitted. When the entry key then releases a response signal to the I response demand signal which include an I code (immobilizing code), the vehicle carries out immobilizing checkup (immobilizing code examination) for deciding whether the I code received is valid or not. When the I code is valid, the transmission of the I response demand signal is canceled and an FI-ECU 33 is switched at t6 into the engine enabling mode.

At the time t7, when the ignition switch (IGN.SW) is automatically turned to the ON position by the quick-start switch 31 switched on, the transmission of the A and B response demand signal is canceled and simultaneously, the refresh-two process is started as will be described later. The function of the quick-start switch 31 will be explained later in more detail referring to FIG. 19. The cancellation of the transmission of the A and B response demand signals maybe initiated by the identification of I code, the on/off shift of the door switch upon the door opening or closing, or the detection of turning movement of the ignition switch (as denoted by the two-dot chain line in FIG. 2).

The movement of the vehicle 1 is stopped and then as the IGN SW is turned manually from the ON position to the ACC position at t1 as shown in the left end of FIG. 3, the FI-ECU 33 is switched to the engine disabling mode. When the door SW is shifted from the OFF position (door closed) to the ON position (door opening) at t2 in the door unlock mode, it is judged that the driver is about to disembark and the transmission of a B small response demand signal (e.g. of 300 kHz having substantially a 0.5-meter-radius communication area denoted by B (small) in FIG. 17) is then commenced. This is followed by transmitting the B small response demand signal at equal intervals of the second predetermined time (x seconds) from the vehicle. Then, as the door SW is shifted from the ON position to the OFF position (door closed) at t3, the I response demand signal is transmitted at the predetermined intervals.

When the entry key is disembarked, it enables to receive not the I response demand signal but the B small response demand signal. Then a response signal to the B small response demand signal including the B code is released. When the response signal including the B code is receive and is judged to be valid at t4, the A response demand signal is commenced to be transmitted while the transmission of the I response demand signal is stopped. The entry key continues to release the A and B codes while receiving both the A and B small response demand signals.

As the driver with the entry key moves away from the vehicle and steps out from the B small area shown in FIG. 17, it is disabled to receive the B small response demand signal and no response signal with B code to the B response demand signal shall be sent back. When the B code is not received by the vehicle after a predetermined period from the reception of the A code (at t5 in FIG. 3), the B response demand signal is switched from the B small signal to the B large signal. As the B code is no more received after the predetermined period while the A code is received and its welcome code examination is executed (i.e. in this embodiment, only the A code is continuously received but the B code has not been received in y seconds), the door is then locked at t7 when the final A code is determined to be valid.

After t8 when the setting (m seconds) of the T-OUT timer has elapsed since the entry key is far enough away from the vehicle not to receive the A response demand signal and thus not to send back the A code, the intermittent transmission of only the A response demand signal at the intervals of y seconds is maintained. Alternatively, as denoted by the dotted line in FIG. 3, the door may be locked at t5 when the A code is received just after the reception of the B code at the estimated moment is not executed.

The operation of the smart entry unit 1 will now be described schematically referring to the flowcharts of FIGS. 4 and 5.

Upon energized, the system is initialized in its entirety (Step S1). At Step S2, it is determined whether the ignition switch (referred to an IGN SW hereinafter) is turned on or not. When the IGN SW is turned off by the driver to stop the vehicle at t1 in FIG. 3, the procedure goes to Step S3 where the refresh 1 process, i.e. the initialization of flags for the (anti-thief) immobilizing system, is carried out. This process at Step S3 will be explained later in more detail referring to FIG. 7 and FIG. 9.

This is followed by Step S5 where it is determined whether the door is unlocked or not. At Step S6, it is determined whether or not the door SW is turned from the ON position to the OFF position (i.e. whether the opened door of the vehicle is closed or not). As it is judged "NO" at Step S6 while the door is opened for disembarkation, the procedure jumps to Step S9 where it is determined whether or not the manual SW 7a is turned on for shifting the system to the manual mode where the door can be unlocked and locked using the manual switch. In normal, the manual SW 7a remains turned off (i.e. the manual mode is not selected) and it is judged "NO". It is then determined at Step S10 whether or not the door SW is turned from the OFF position to the ON position (i.e. the closed door is opened).

As the door is opened for disembarkation, the door switch is turned from the OFF position to the ON position and it is judged "YES" at Step S10. Then, Step S11 follows where it is determined whether the BREC flag is 1 or not (i.e. the B code: is received or not). In the beginning, the B code is not received and the procedure advances to Step S12 where the BSTM flag is set to 1 and the variable n for determining the type of the response demand signal (A, B small, or B large) is reset to 0.

Step S12 is a process of selecting the type of the response demand signal to be transmitted and, as will be explained later, the B small type having a smaller communication area is set. At Step S13, the timer interruption permitting bit for enabling the transmission of the response demand signal is set, i.e. the transmission of the response demand signal by timer interruption is enabled.

Then Step S14 follows where it is determined whether the valid ID code is received or not. When it is affirmative, it is then judged at Step S15 what the function code is. More specifically, it is determined whether received signal is the response signal (A code or B code) from the entry key 50 or the manual code for the manual operation. In the beginning, it is judged "NO" at Step S14 and the procedure moves to Step S15A where it is determined based on the IMCHK flag whether the immobilizing checkup is finished or not. At the time, the immobilizing checkup is not performed and the procedure jumps to Step S30 (in FIG. 5). Similarly, it is judged "NO" at Step S30 and the procedure goes to Block S41. At Block S41, the flags for the welcome function are initialized when the code is not received during a predetermined period of time.

In fact, it is determined referring to the OUT flag at Step S31 whether or not the entry key is out of the communication area for the A response demand signal. In the beginning, it is not registered (i.e. OUT flag=0) that the entry key is out of the communication area for the A response demand signal. It is then determined at Step S32 whether the RCHK flag is 1 or not (i.e. the T-OUT timer for setting time duration to determine that the entry key is not adjacent to the vehicle, has been started or not). When it is judged "NO", the procedure goes to Step S33 where the T-OUT timer is set to m seconds.

It is preferable that m satisfies m sec>y(=3x) sec≧z sec where y is the interval of transmission (or cycle) of the A response demand signal, x is the interval of transmission of the B response demand signal, and z is the interval of transmission of the I (immobilizing) response demand signal, as shown in FIG. 2. Then, at Step S34, the RCHK flag is set to 1 for starting the T-OUT timer.

This is followed by Step S35 where it is determined whether the T-OUT timer is turned to zero as the setting time of m seconds has been elapsed. In the beginning, the setting time of m seconds is not elapsed and thus the procedure returns back to Step S2.

As the driver disembarks and the door is closed, the door switch is shifted from the ON position to the OFF position allowing Step S6 to judge "YES". The procedure thus goes to Step S7 where the refresh 1 flag is reset to 0. Step S8 follows where the timer interruption permitting bit for permitting the transmission of the I response demand signal is initiated to enable the transmission of the I response demand signal with timer interruption. Then, the procedure moves to Steps S9, S10, S14, S15A, and S30, and Block S41 and returns back to Step S2.

As the entry key 50 is moved out of the vehicle, it receives the B small response demand signal and sends back the B code. The B code from the entry key 50 is received by the receiver on the vehicle and valid as a valid code and it is then judged "YES" at Step S14. The procedure thus goes to Step S15 where it is determined whether or not the signal code received is the manual code sent from the entry key 50 by the manual switch operation for locking and unlocking the door. When it is judged "YES", the procedure advances to Step S16 where the manual operation is enabled (which is a process to interpret the code issued through the manual switch operation and will be explained later in more detail referring in FIG. 10).

As the received code is the B code carried on a response signal to the response demand signal at present, it is judged "NO" at Step S15 and the procedure moves to Step S17 where it is determined whether the manual SW is turned on or not. When it is judged "YES" at Step S17, the procedure returns back to Step S2. As "NO" is given at Step S17, however, the procedure goes to Step S18 where the welcome function process for unlocking and locking the door in response to the result of the welcome code judgment is executed. The welcome function process will be explained later in more detail referring in FIG. 11.

When it is judged "not" at Step S14, the examination at Step S15A is carried out. When it is judged "not" at the latter step, the procedure goes to Step S30 shown in FIG. 5 where the process described is performed. When it is judged "yes" at the step, the procedure moves to Step S16A for immobilizing checkup. The immobilizing checkup will also be explained later in more detail referring to FIG. 13.

Welcome Function Process at Disembarkation

The welcome process at Step S18 in FIG. 4 will now be explained in more detail referring to FIGS. 11 and 12. It is assumed that the driver stops the engine, disembarks, and departs with the entry key from the vehicle. As described previously, the disembarkation of the driver is followed by Step S12 (FIG. 4) for selecting the transmission of the B small response demand signal and resetting the variable n to 0 and Step S13 for enabling the transmission of the B response demand signal with timer interruption. Then, the welcome process is commenced at Step S18 in response to the reception of the correct B code.

The welcome process starts with Step S171 where 0 it is determined whether the signal code received from the entry key is the A code or not. In the beginning, since the A response demand signal is not transmitted it is judged "NO", allowing the procedure to goes to Step S201. When it is judged at Step S201 that the received code coincides with the right B code, the procedure moves to Step S202 where the BREC flag representing the reception of the B code is set to 1 while the number of consecutive receptions of the A code denoted by I is set to zero.

At Step S203, the manual code transmitted from the entry key 50 is received and it is determined where the MU flag indicating that the manual code priority controlling is in action is set to 1 or not, as will be described later in more detail. When Step S203 judges "yes", the procedure goes to Step S213 where it is determined whether the T-MU timer for setting the period of door lock priority controlling with the manual code is timed up or not. When it is judged "yes", the procedure goes to Step S204 where the door is unlocked. Then Step S205 follows for turning the MU flag to 0. When it is judged "not" and the action is within the priority period, the procedure skips Step S204 and S205 and jumps to Step S209. If it is judged "not" at Step S203, the procedure moves to Step S204 for unlocking the door.

It is then determined at Step S209 whether the AREC flag is 1 or not. As the A code is not received by now, it is judged "NO". The procedure hence goes to Step S210 where the ATM flag is set to 1 for enabling the intermittent transmission of the A response demand signal. At Step S211, the variable n is set to 0. At Step S212, the timer interruption permitting bit for the I response demand signal is cleared off to inhibit the transmission of the I response demand signal. At Step S214, the BCHG flag is set to 0. While the B code only is received continuously, the above steps are repeated.

When the A code is released from the entry key in response to the reception of the A response demand signal and received the vehicle, it is judged "YES" at Step S171. The procedure then goes to Step S172 where the AREC flag is set to 1 while the OUT flag and the RCHK flag are turned to 0 to register that the entry key 50 is within the communication area for the A response demand signal and reset the T-OUT timer. At next Step S173, the variable I indicating the number of consecutive reception of the A code is increased by 1 for updating (I is thus turned to 1). It is then determined at Step S174 whether or not the variable I is turned to 2 (for example). In the beginning, I is not 2 and the procedure jumps to Step S180.

It is determined at Step S180 whether the BSTM flag indicating the selection of the B small response demand signal is 1 or not. As the BSTM flag is 1 so far, it is judged "YES" and the procedure moves to Step S181 where it is determined whether the BCHG flag for causing the B response demand signal being switched from the B small to the B large is 1 or not. As the BCHG flag is now 0, the procedure goes to Step S182 for setting the BCHG timer to, for example, 30 seconds.

The setting time for the BCHG timer may be determined on the basis of experiments or actual measurements to a duration enough to allow the entry key to get away enough from the vehicle and step out of the communication area for the B large response demand signal. Then, the procedure moves to Step S184 where the BCHG flag is shifted to 1. It is then determined at Step S185 whether the BCHG timer is turned to zero or not. In the beginning, the timer is not zero and the procedure returns back to Step S2.

When the A code is next received from the entry key, the procedure jumps from S174 to S180 and then from S181 to S185. As it is judged "NO" at Step S185 before the setting time (for example, 30 seconds) of the BCHG timer elapses, the procedure returns back to Step S2. When the setting time has elapsed, however, it is judged "YES" at Step S185.

As a result, the procedure advances to Step S186 where the BSTM flag for selecting the B small response demand signal is turned to 0. At Step S187, the BLTM flag for selecting the B large response demand signal is turned to 1. Accordingly, the transmission of the B large response demand signal is initiated by timer interruption. As the entry key is far enough away the vehicle and out of the communication area of the B large demand signal at the time, it is disabled to receive the B large response demand signal and sends back non of the B code.

As the entry key has departed from the signal receivable area (See FIG. 17) of the B small area response demand signal, the B code is not received by the vehicle but the A code. As the A code is received continuously, the decision at Step S171 in the welcome function procedure is constantly "yes". As a result, the variable I is updated to2 at Step S173 causing the decision at Step S174 to be "yes". Then, it is determined at Step S175 whether or not the MU flag is 1 (indicating that the manual code priority controlling is in action). As it is now judged "not", the procedure advances to Step S176 where the door is locked.

When it is judged "yes", the procedure goes to Step S179 where it is determined, similar to Step S213, whether the T-MU timer is timed up or not, i.e. the manual code priority processing action is completed or not. When it is judged "yes", the procedure moves to Step S176 for locking the door. This is followed by Step S177 where the MU flag is reset to 0. Then, at Step S177A, it is determined whether the EM (emergency) flag is 1 or not. When not, the procedure goes to Step S178. When so, the procedure skips Step S178 and jumps to Step S180. Returning to Step S178, the CAUT flag is turned to 0 for addressing accommodation of the valet key and simultaneously the VKLK flag is shifted to 0 for interlocking the valet key. When not in the emergency mode, the accommodation and interlocking of the valet key are carried out. However, when the emergency mode is applied, the valet key is not subjected to the accommodation and the interlocking but enabled to work after the doors are locked.

When it is judged "not" at Step S179, the procedure advances to Step S180. Step S180 is then followed by Step S188 and the welcome procedure is terminated.

As the entry key has departed further from the vehicle, the A response demand signal can hardly be received and no transmission of the A code is expected. This causes the decision at Step S14 shown in FIG. 4 to be negative and the procedure moves from Step S15A to Step S30 shown in FIG. 5. This is followed by the routine S41 where the examinations at Steps S31 and S32 are carried out and the T-OUT timer is set tom seconds at Step S33. When the decision at Step S35, is negative, the procedure returns back to Step S2 for repeating the actions.

Figure 5:
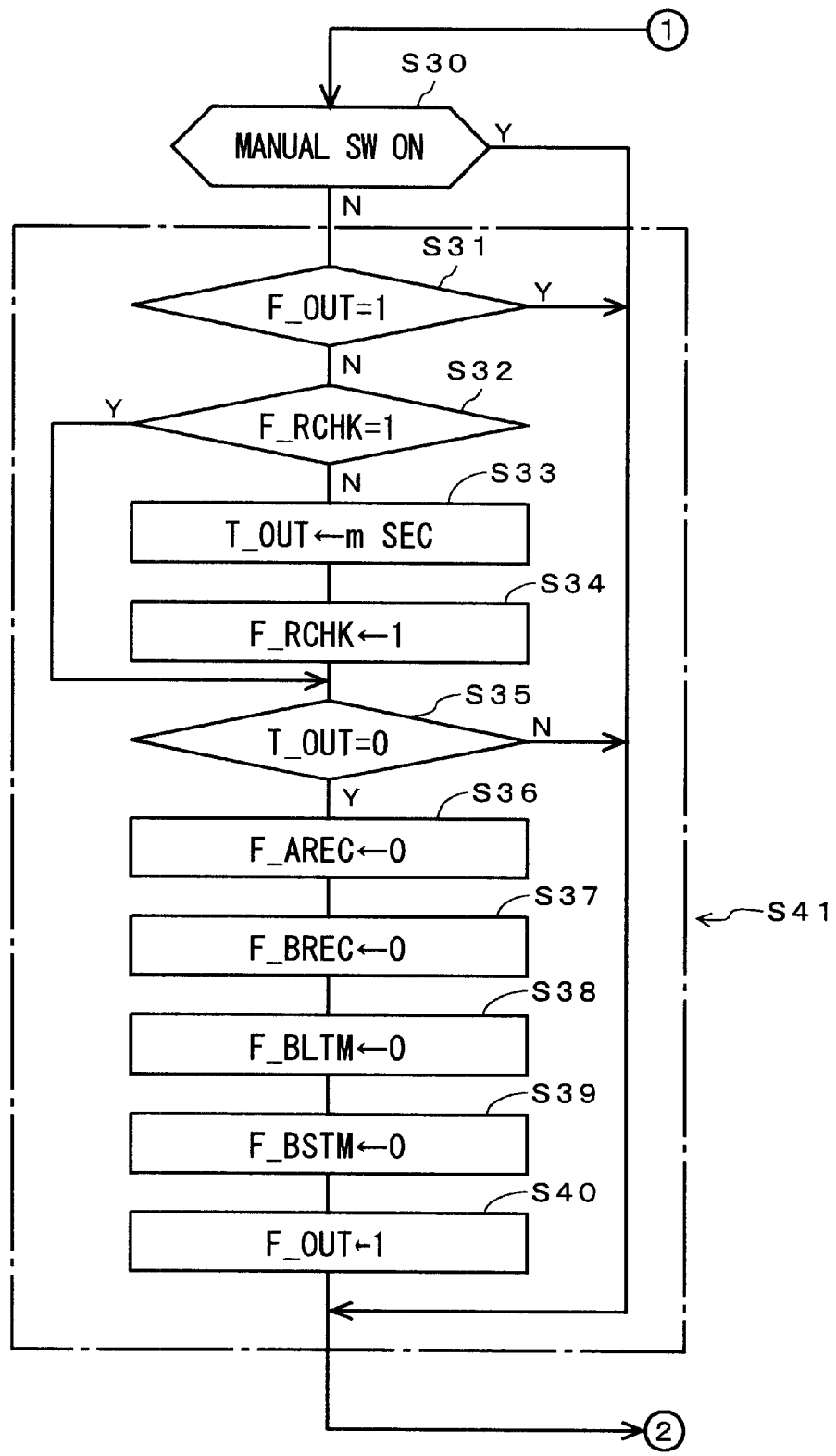
FIG. 5 is a flowchart connected from ① and ② of FIG. 4.

When the A code is no more sent back and it is thus judged "YES" at Step S35 after m seconds of the setting time on the T-OUT timer, i.e. any sent-back code from the entry key 50 is not received in a duration of m seconds, as illustrated in the flowchart of FIG. 5, the procedure moves to Steps S36 to S39 for initializing the AREC, BREC, BLTM, and BSTM flags to 0 which flags relate to the welcome process. The procedure then goes to Step S40 where the OUT flag is turned to 1 to register that the entry key 50 is out of the communication area for the A response demand signal. This is followed by the procedure returning back to Step S2 for repeating the steps.

As the BLTM and BSTM flags are set to 0 at the time, the procedure is after t8 in FIG. 3 and before t1 in FIG. 2 where the intermittent transmission of only the A response demand signal is executed. As apparent, the A response demand signal is not received by the entry key and its response signal carrying the A code is not sent back.

Welcome Function Process at Embarkation

A case of the driver with the entry key 50 approaching and embarking the vehicle will now be explained. As the entry key moves from a far enough point where the A response demand signal cannot be received to a near point within the communication area for the A response demand signal, it receives the A response demand signal and sends back the A code in response. When the A code is received by the vehicle, it is judged "YES" at Step S14 and the procedure goes to Step S15 for judgment whether the received code is the manual code or not.

When the judgment is affirmative, the procedure advances to Step S16 for executing the manual operation process. The manual operation process will be explained later in more detail referring in FIG. 10. The received code is not assumed now to be the manual code and it is thus judged "NO" at Step S15. The procedure then moves to Step S17 where it is determined whether the manual SW is turned on or not. When so, the procedure returns back to Step S2. But it is now judged "NO" and the procedure goes to Step S18 for initiating the welcome process shown in FIG. 11.

In the welcome process, "YES" at Step S171 and "NO" at Step S174 are provided and the procedure jumps to Step S180. As "NO" is also given at Step S180, it is determined at Step S188 whether the BLTM flag is 1 or not. At the time, the BLTM flag is not 1 and procedure moves to Step S189 where the BLTM flag is shifted to 1 to select the transmission of the B large response demand signal. Then at Step S190, the variable is set to 1. While only the A code is received from the entry key, the above steps are repeated (excepting that because "YES" is given at Step S188, Steps S189 and S190 are skipped). The A response demand signal and the B large response demand signal are thus transmitted at their respective intervals of time.

As the driver steps closer to the vehicle, the entry key is enabled to receive the B large response demand signal from the vehicle and send back the B code. When the B code is received by the vehicle, it is judged "NO" at Step S171 but "YES" at Step S201. Accordingly, the door is unlocked at Step S204. As the A code has been received at that time, "YES" is given at Step S209 and the transmission of the I response demand signal is inhibited at Step S212. At next Step S214, the BCHG flag is shifted to 0 to inhibit the switching of the response demand signal from the B large to the B small.

Figure 4:
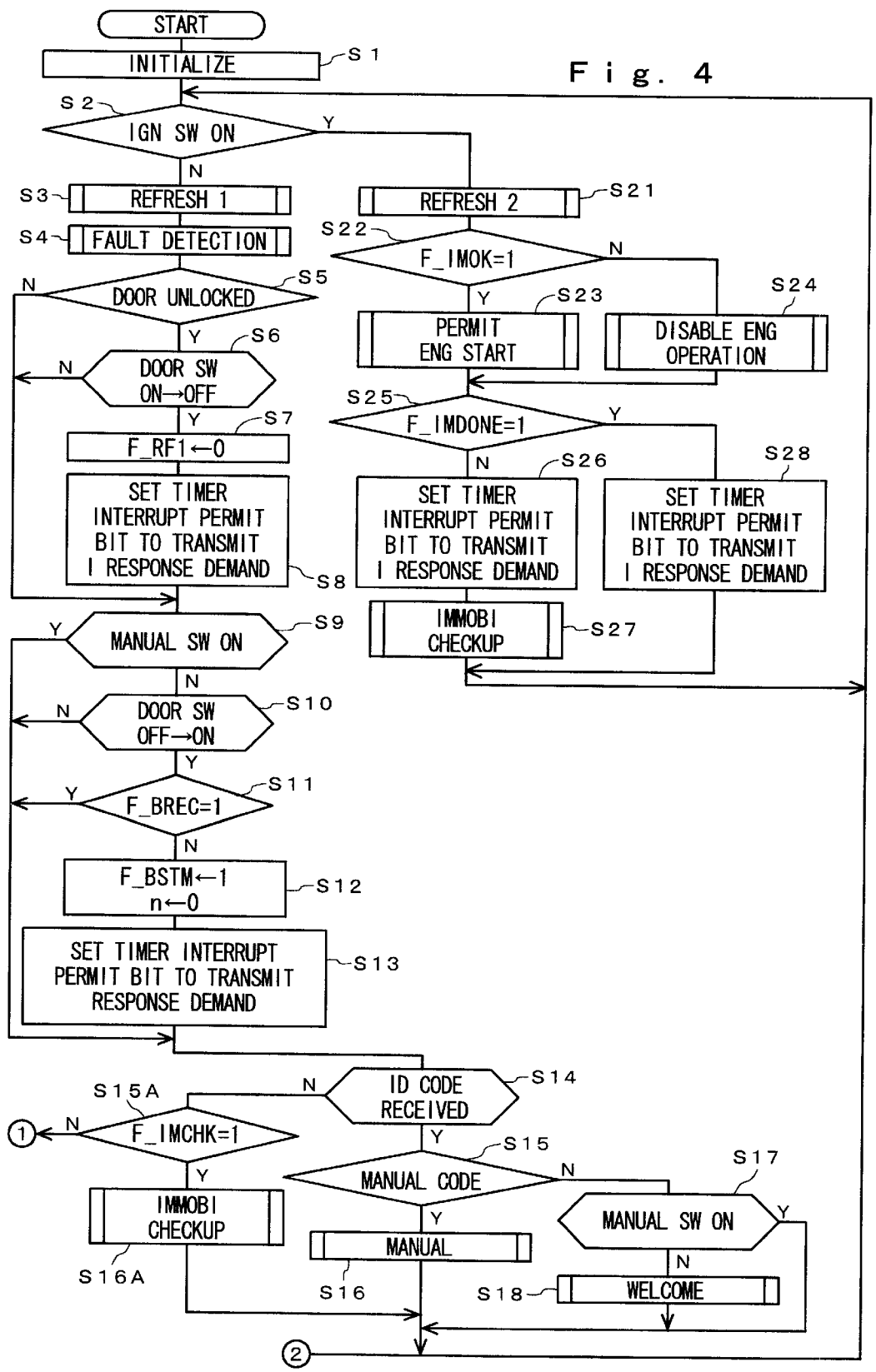
FIG. 4 is a flowchart schematically showing the action of the smart entry unit.

As the driver opens the door, steps in the vehicle, and closes the door, it is judged "YES" at Step S6 (FIG. 4). Then, the timer interruption permitting bit for permitting the transmission of the I response demand signal is enabled at Step S8 to permit the timer interrupted intermittent transmission of the I response demand signal. At the time, the entry key is disabled to receive the A and B response demand signals (which are transmitted to only the outside of the vehicle) and hence, none of the A code and the B code are received by the vehicle.

The entry key 50 receives the I response demand signal and responds to send back the I code. When the I code is received by the vehicle, the procedure runs through Steps S14, S15, and S17 and enters at Step S18 the welcome process shown in FIG. 11. As it is judged "NO" at both Steps S171 and 201, the procedure advances to Step S221 shown in FIG. 12. A block denoted by the chained line SC in FIG. 12 is a known immobilizing process.

It is determined at Step S221 whether the IMDONE flag indicating the completion of the immobilizing checkup is 1 or not. At the time, the immobilizing checkup is not executed and the procedure goes to Step S222 for executing the immobilizing checkup. In the immobilizing checkup, the I code received is determined whether it is valid or not as will be explained later referring to FIG. 13. When so, the IMOK flag is turned to 1. Step S223 follows where the immobilizing checkup result is determined based on the IMOK flag whether or not it is all right.

When it is judged "NO" at Step S223, the operation of the engine is disabled at Step S227. When it is "YES", the procedure goes to Step S224 for permitting the start of the engine. At Step S225, the ATM flag is shifted to 0 and at Step S226, the AREC flag is shifted to 0. In the next cycle of receiving the I code, it is judged "YES" at Step S221. The procedure then moves to Step S228 where the timer interruption permitting bit for the I response demand signal is cleared off to prohibit the intermittent transmission of the I response demand signal.

The bit information of the IMOK flag is transferred via the communication line (bus) 32 to the FI-ECU 33 (See FIG. 1). In response to the bit of the IMOK flag, the FI-ECU 33 controls the action of a fuel pump, a fuel injector, a fuel feeder, and an ignition device (each not shown) in any known manner so that when the bit is 1, the engine is enabled and while when 0, the engine is disabled.

Figure 11:
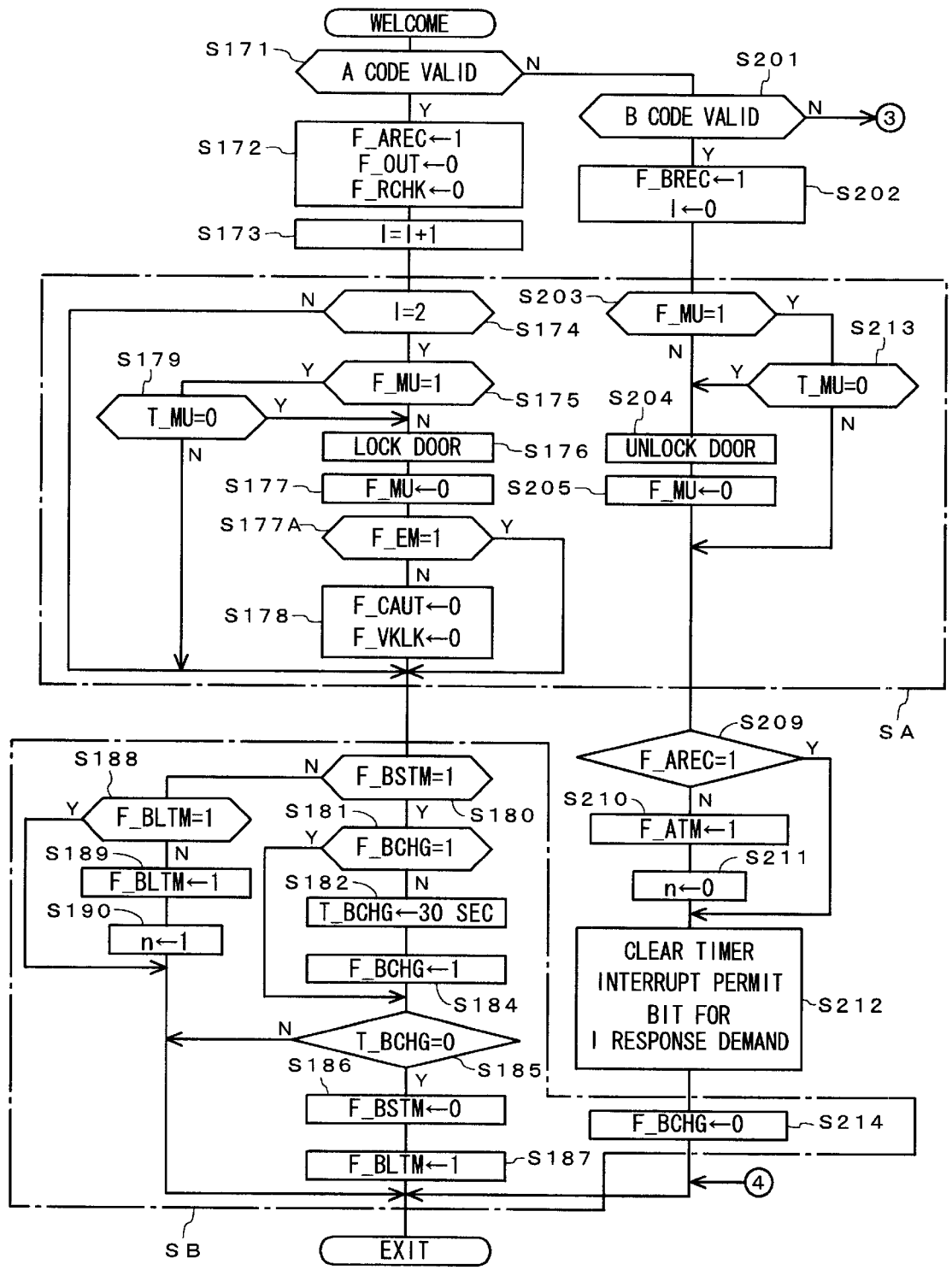
FIG. 11 is a flowchart showing in more detail the action of "welcome function process" of FIG. 4.
Figure 12:
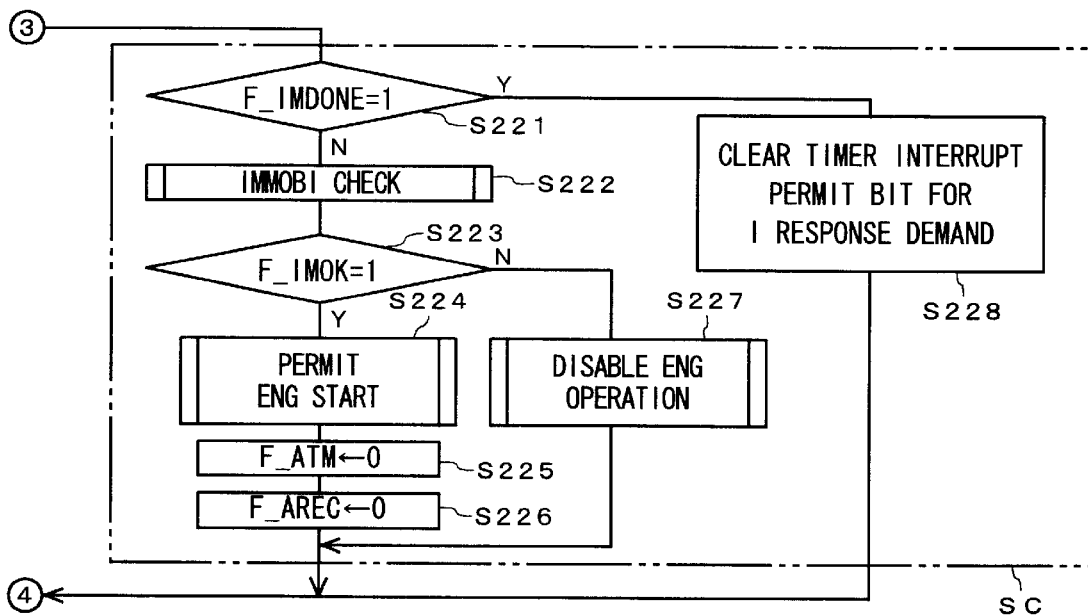
FIG. 12 is a flowchart connected from ③ and ④ of FIG. 11.

The blocks enclosed with the chain line SB in FIG. 11 are provided for assigning different levels of hysteresis to the communication area for the B response demand signals at the embarkation and the disembarkation, and selecting the B small response demand signal when the driver gets away from the vehicle for permitting the door locking at earlier timing and while the B large response demand signal when the driver approaches towards the vehicle for permitting the door unlocking at possibly earlier timing. It would hence be appreciated that when the hysteresis is not applied, the blocks for switching between the B small signal and the B large signal is unnecessary.

When the driver embarks and switches on the quick-start switch 31 allowing the auto-turn mechanism to automatically turn the IGN.SW to the ON position, the decision at Step S2 shown in FIG. 4 becomes positive and the procedure goes to Step S21. Then, the refresh-two process or the initialization of the flags related to the welcome function is executed. Then, Step S22 follows for determining whether or not the IMOK flag is 1 (i.e. the immobilizing code is found eligible). As it is now judged "yes", the procedure goes to Step S23 where the action of the engine is enabled.

This is followed by Step S25 where the decision is positive when the IMODONE flag is 1 (indicating that the immobilizing checkup has finished). Then, the procedure goes to Step S28 where the timer interruption permitting bit in the I response demand signal is cleared off to cancel the transmission of the signal. While the vehicle is being turned on, the IGN.SW remains switched on and the foregoing procedure is repeated.

When it is judged "not" at Step S25, the procedure moves to Step S26 where the timer interruption permitting bits are enabled for permitting the transmission of the I response demand signal, similar to Step S8. This is followed by Step S27 where the immobilizing checkup is carried out as will be described later referring to FIG. 13. Then, the procedure goes from Step S2 to Step S22.

When the IGN SW is turned to the ACC or OFF position to stop the engine, it is judged "NO" at Step S2. The procedure then moves to Step S3 for executing the above described process at the disembarkation.

Figure 6:
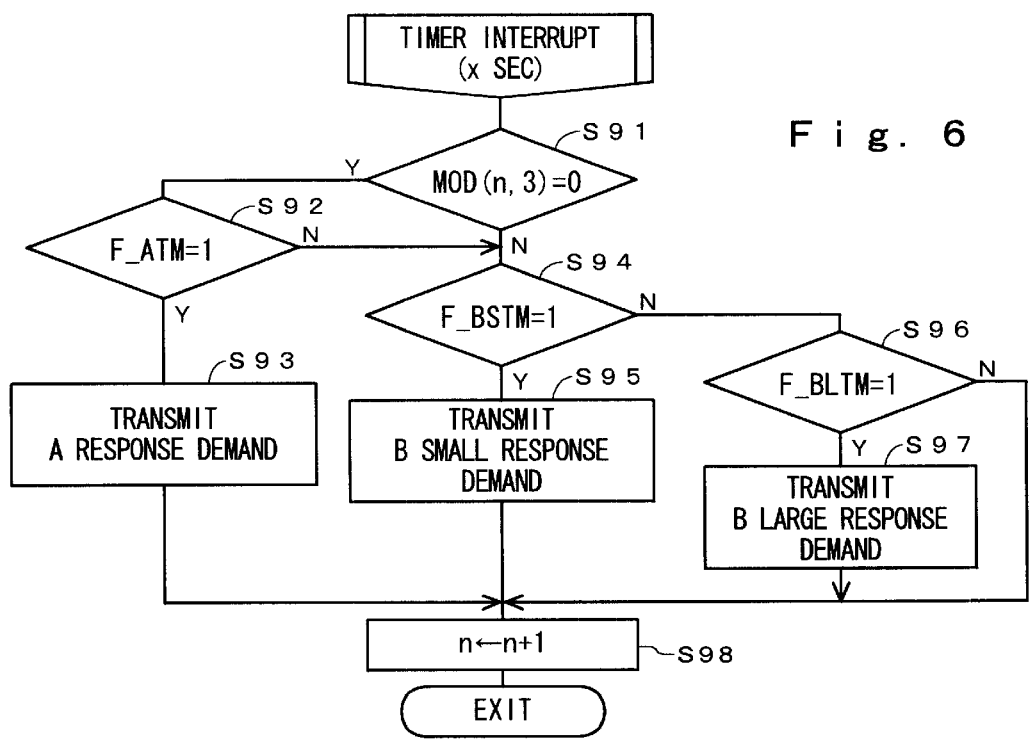
FIG. 6 is a flowchart showing the transmission of A, small B, and large B start signals.

The transmission of the response demand signals in the welcome process will be explained referring to FIG. 6. This process is executed in every x seconds by the timer interruption to intermittently transmit the A or B (B large or B small) response demand signal, provided that the response demand signal transmission selecting flag is 1. The A, B large, and B small response demand signals may be selected as previously described referring to FIGS. 2, 3, and 17.

The procedure starts with Step S91 for determining whether MOD(n,3) is zero or not. MOD(n,3) is the remainder of the variable n divided by 3, which n is described previously concerning with Steps S190 and S211. When MOD(n,3) is zero, the procedure goes to Step S92 where it is determined whether the ATM flag is 1 or not. When so, the procedure goes to Step S93 for permitting the transmission of the A response demand signal.

When the remainder of n/3 is 1 or 2, it is judged "NO" at Steps S91 or S92 and the procedure moves to Step S94 where the BTSM flag is determined whether it is 1 or not. When so, the procedure goes to Step S95 for permitting the transmission of the B small response demand signal. When judged "NO" at Step S94, the procedure moves to Steps S96 for determining whether the BLTM flag is 1 or not. When so, the procedure advances to Step S97 for permitting the transmission of the B large response demand signal.

Figure 7:
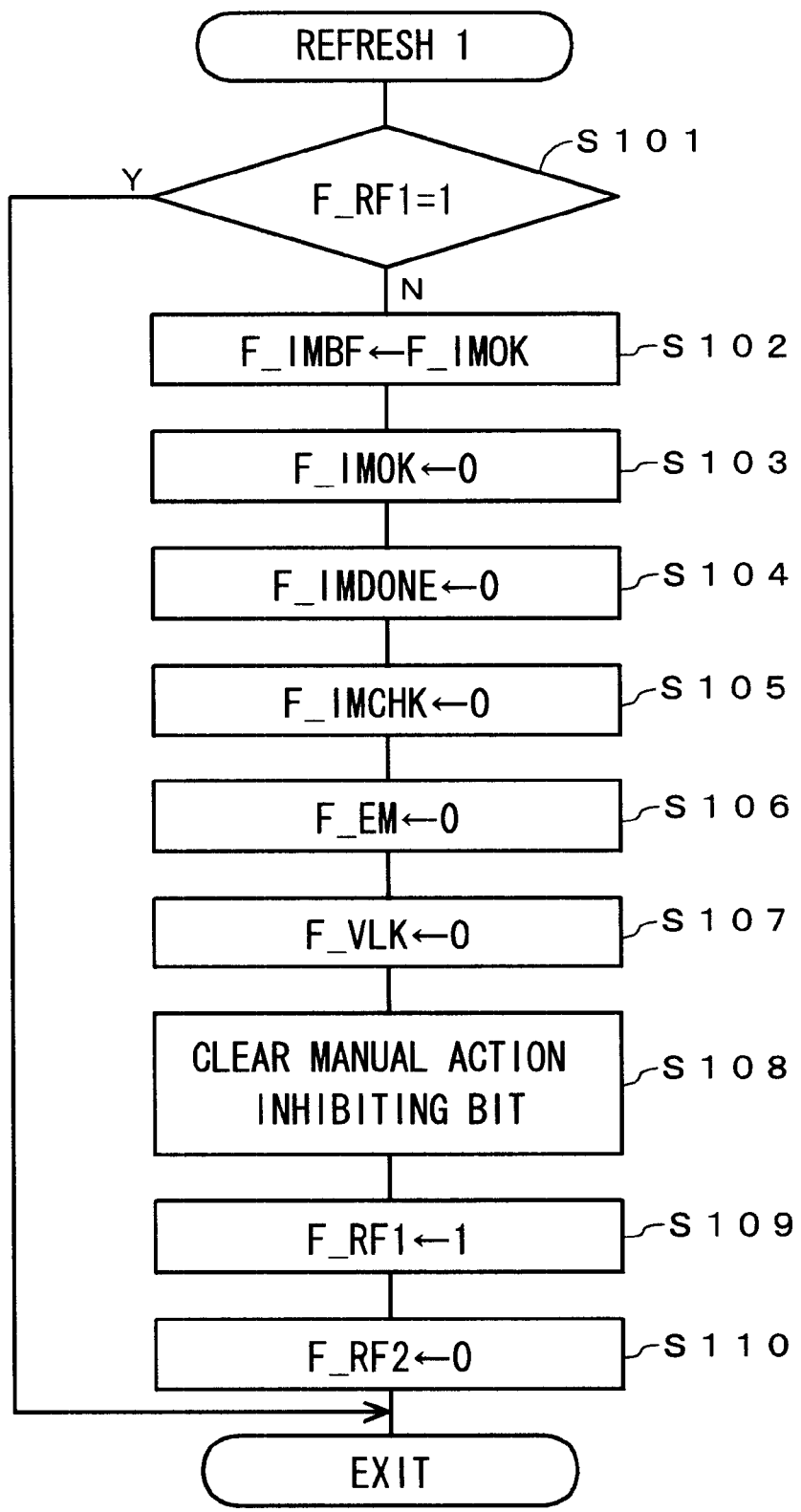
FIG. 7 is a flowchart showing in more detail the action of "refresh one process" of FIG. 4.

The refresh 1 process at Step S3 (FIG. 4) will now be explained referring to FIG. 7. At Step S101, the RF1 (refresh 1) flag is determined whether or not it is 1 as indicating that the refresh 1 process is completed. When judges "YES", i.e. the refresh 1 process is completed, the procedure jumps to EXIT. As, in the beginning, it is judged "NO", IMBF flag (indicating the result of the preceding immobilizing checkup) is replaced to IMOK (indicating the result of immobilizing checkup).

At next Step S103, the IMOK flag is shifted to 0 and at Step S104, the IMDONE flag (immobilizing checkup is done) is shifted to 0. At Step S105, the IMCHK flag (immobilizing checkup is started) is reset to 0.

At Step S106, the EM (emergency) flag is turned to 0 and at Step S107, the VLK flag (indicating that the valet key is withdrawn in the emergency mode) is set to 0.

Then, Step S108 follows where the manual action inhibiting bit is cleared off.

As the result, the initialization of the immobilizing checkup flags is completed. At Step S109, the RF1 flag is turned to 1 to register that the refresh 1 process has been done. At Step S110, the RF2 flag is turned to 0 to register that the refresh 2 process is not yet done.

Figure 8:
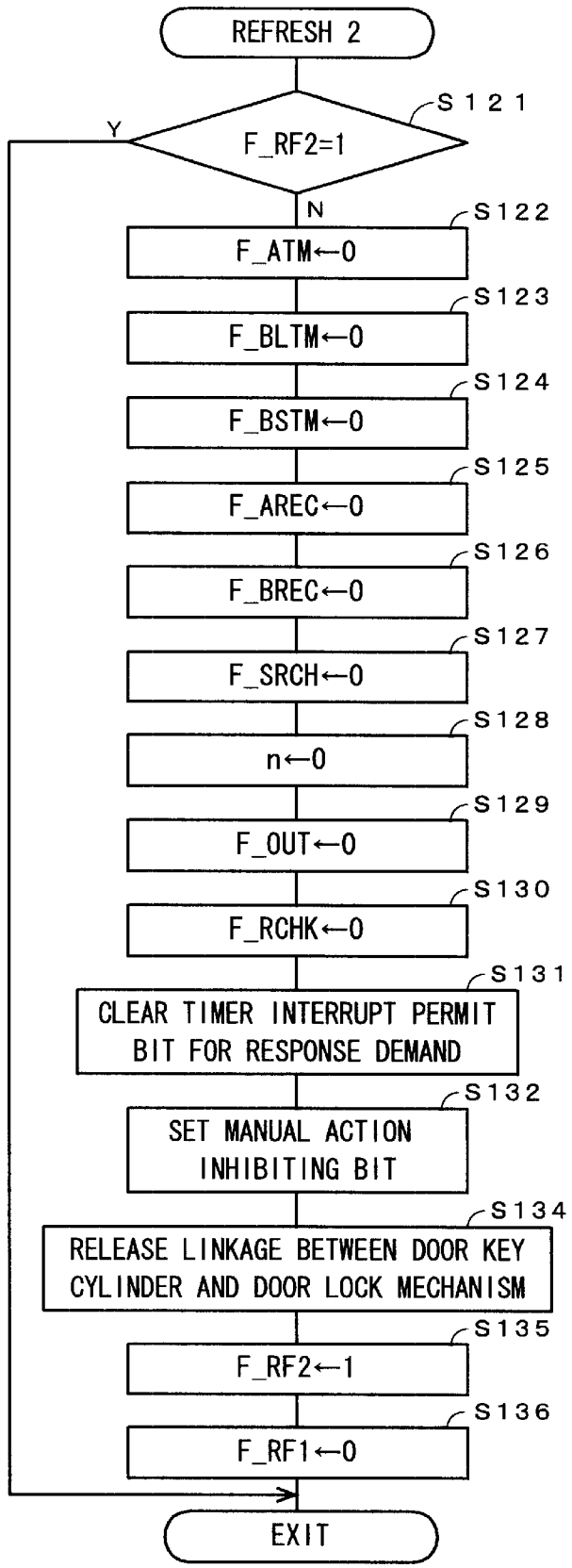
FIG. 8 is a flowchart showing in more detail the action of "refresh two process" of FIG. 4.

The refresh 2 process at Step S21 (FIG. 4) will be explained in more detail referring to FIG. 8. At Step S121, the RF2 flag is determined whether it is 1 or not, i.e. the refresh 2 process has been done or not. When "YES", the procedure jumps to EXIT. When judged "NO", the procedure runs through Steps S122, S123, and S124 for resetting the ATM, BLTM, and BSTM flags to 0, respectively. Those steps are to inhibit the transmission of the A, B large, and B small response demand signals, respectively.

This is followed by Steps S125 and S126 for resetting the AREC and BREC flags to 0, respectively. These two steps are provided for registering that the code, which is included in a response signal send back from the entry key 50 in response to the reception of the demand signal transmitted from the vehicle, is not yet received by the receiver on the vehicle. At Step S127, SRCH flag (completion of fault detection) is turned to 0. At Step S128, the variable n for determining the response demand signal to be transmitted is turned to zero.

At Step S129, the OUT flag is shifted to 0 (denied) for indicating that the entry key 50 is out of the communication area of the A response demand signal. At Step S130, the RCHK flag is set to 0 to indicate that the T-OUT timer is not started which sets the limited time for detecting whether or not the entry key 50 is out of the communication area for the A response demand signal. At Step S131, the timer interruption permitting bit for the response demand signal is cleared off to inhibit the timer interrupted transmission.

At Step S132, the manual action inhibiting bit is set on and at Step S134, the linkage between the door key cylinder and the door lock mechanism is inhibited.

After the above steps, the initialization of the welcome function flags are completed. Then, Step S135 follows where the RF2 flag is turned to 1 to register the completion of the refresh 2 process. At Step S136, the RF1 flag is reset to 0 for registering the non-completion of the refresh 1 process.

Figure 9:
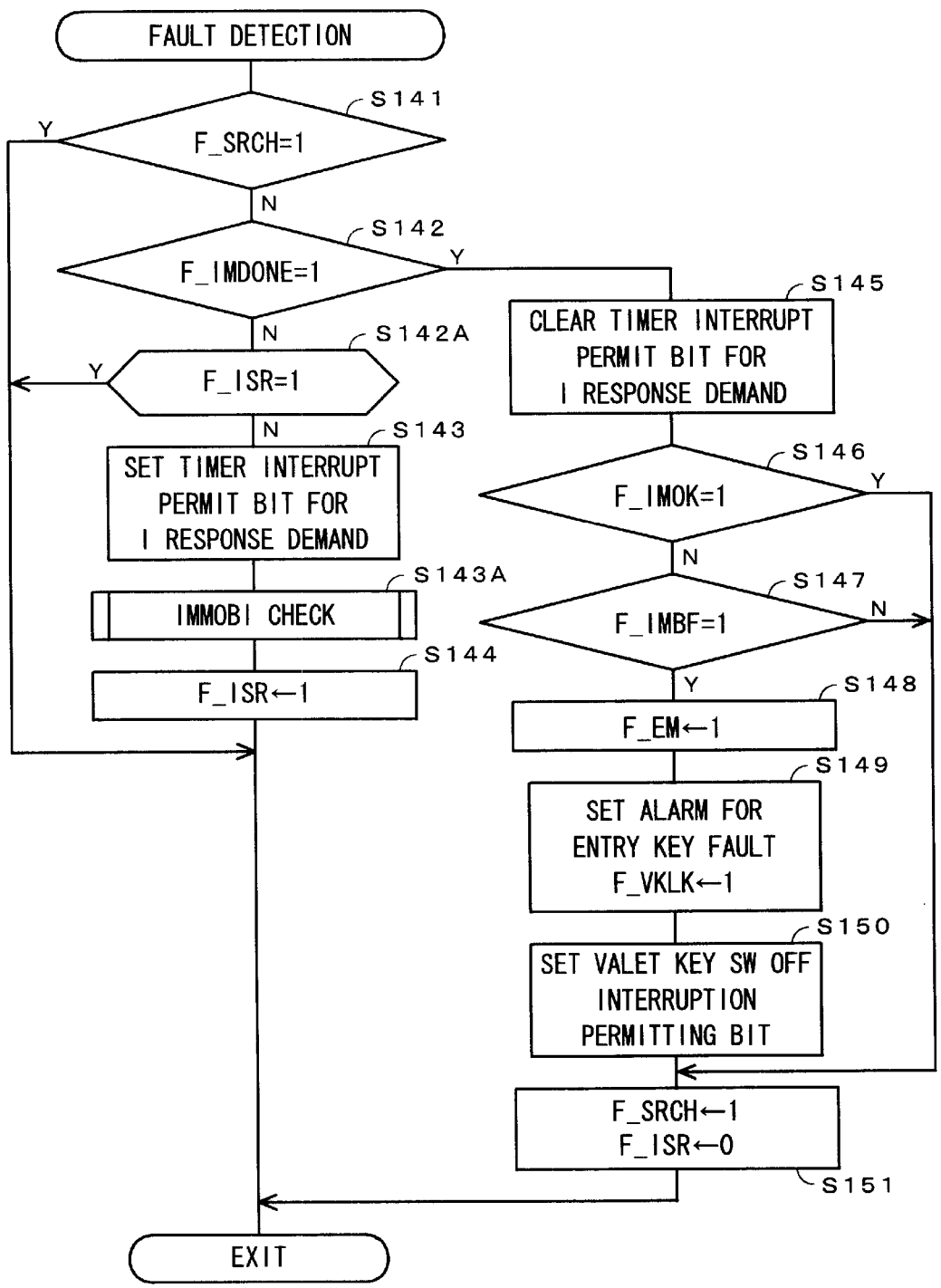
FIG. 9 is a flowchart showing in more detail the action of "fault detection process" of FIG. 4.

A procedure of the fault detection at Step S4 (See FIG. 4) is now explained in more detail referring to FIG. 9. It is first determined at Step S141 whether the RCH flag indicating that the fault detecting process has finished is 1 or not. As the decision is negative at the beginning, the procedure goes to Step S142 for determining whether the IMODONE flag (indicating the completion of the immobilizing checkup) is 1 or not. As the decision is also negative, the procedure moves to Step S142A where it is determined whether the fault detecting (ISR) flag is 1 or not. When the fault detection is not being carried out, the procedure goes to Step S143 where the I response demand signal transmitting timer interruption permitting bit is set on to permit the timer interruption. Then, at Step S143A, the immobilizing checkup is carried out and at Step S144, the ISR flag indicating that the fault detection is carried out is set to 1, then the procedure goes to the exit (EXIT) and Step S5 follows. The procedure from Step S5 is as described previously and its explanation will not be repeated. In the welcome function process at Step S18, the IMDONE flag indicating the completion of the immobilizing checkup is shifted to 1.

As the procedure of the fault detection at Step S4 continues, the decision at Step S142 is positive with the IMDONE flag set to 1. This is followed by Step S145 where the I response demand signal transmitting timer interruption permitting bit is cleared off to inhibit the I response demand signal transmitting timer interruption. It is then determined at Step S146 whether the IMOK flag (indicating that the immobilizing checkup is valid OK) is 1 or not. As the decision is normally positive, the procedure skips Steps S147 to S150 and goes to Step S151 for shifting the SRCH flag and the ISR flag to 1 and 0 respectively before it is terminated. Since the RCH flag indicating that the fault detection is completed is 1, it is judged "yes" at Step S141 and the procedure goes to the exit (EXIT) for starting Step S5.

However, if the entry key has a fault, for example, disabling the transmission of the signals, the IMOK flag in the immobilizing process is not 1 and the decision at Step S146 becomes negative. Then, the procedure goes to Step S147 for examining the IMBF flag. When the IMBF flag is 1, i.e. it is recognized that the start of the engine is carried out by the authentic owner or driver and the preceding immobilizing checkup is valid, it is then judge that the entry key is defective. At Step S148, the EM (emergency) flag is turned to 1 indicating that the entry key has a fault. Then, Step S149 follows where the alarm indicating the entry key is defective is issued and the VKLK flag is shifted to 1 for canceling the interlocking of the valet key 21. At Step S150, the valet key switching off interruption permitting bit is set on to permit the interruption with the switching off of the valet key. The procedure then moves to Step S151 for shifting the SRCH flag and the ISR flag to 1 and 0 respectively before it is terminated.

Figure 10:
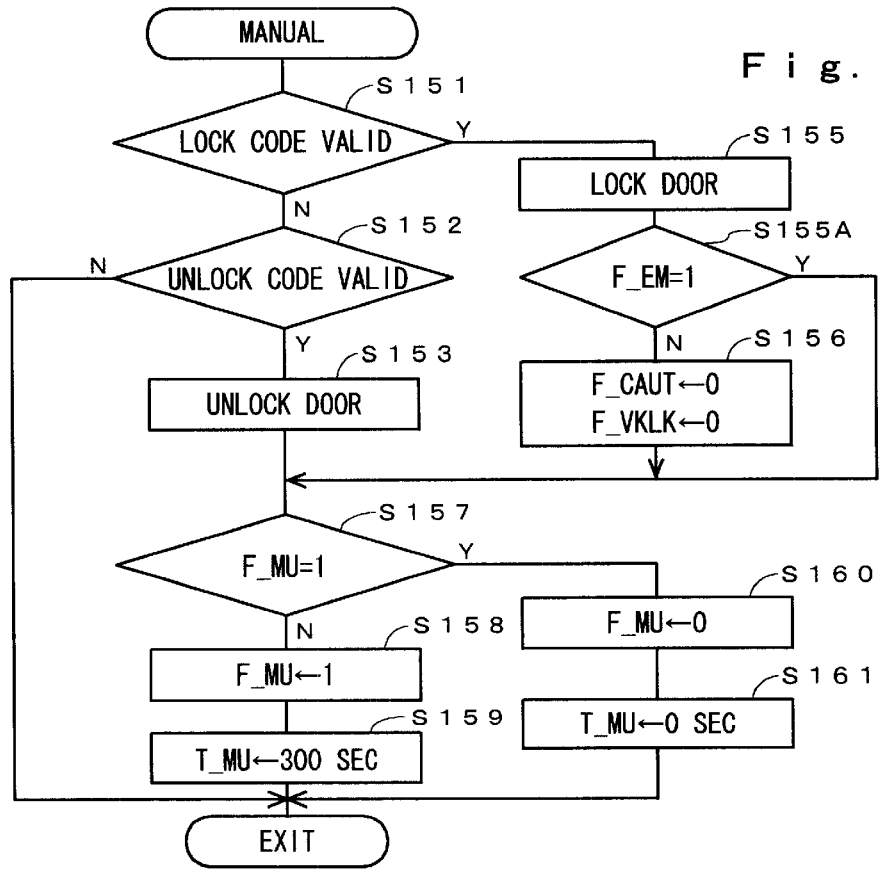
FIG. 10 is a flowchart showing in more detail the action of "manual process" of FIG. 4.

A procedure of the manual operation at Step S16 (See FIG. 4) will be described referring to FIG. 10. When the manual code transmitted from the entry key 50 in response to the action of the manual locking and unlocking switches 56, 57 is received by the vehicle, the decisions at Steps S14 and S15 become positive and the manual process at Step S16 is carried out.

The procedure of the manual process starts with Step S151 where it is determined whether or not the received manual code is a lock code released by the manual locking switch 56 of the entry key 50 manually turned on. When not, the procedure goes to Step S152 where it is determined that the manual code is an unlock code released by the manual unlocking switch 57 of the entry key 50 manually turned on. When not, the procedure is terminated as moving to the exit (EXIT)

When it is judged "yes" at Step S152, the procedure goes to Step S153 where the door of the vehicle is unlocked. Alternatively, when it is judged "yes" at Step S151, the procedure goes to Step S155 where the door of the vehicle is locked. This is followed by Step S155A for determining whether the EM (emergency) flag is 1 or not. When not, the procedure moves to Step S156. When so, the procedure skips S156 and goes to Step S157. At Step S156, the CAUT flag is turned to 0 for addressing accommodation of the valet key and the VKLK flag is shifted to 0 for interlocking the valet key. Accordingly, when the emergency mode is not involved, the valet key is stored and interlocked. But, once the emergency mode is applied, the accommodation and the interlocking of the valet key are canceled hence allowing the valet key to be in service after the doors are locked.

It is then determined at Step S157 whether the MU flag (indicating the manual code priority controlling process is being carried out) is 1 or not. When not, the MU flag is shifted to 1 at Step S158 for registering that the priority process is carried out. This is followed by Step S159 where the manual timer for determining the period of the priority process is set to, for example, 300 seconds before the procedure is terminated.

When it is judged "yes" at Step S157, the procedure goes to Step S160 for shifting the MU flag to 0 and then to Step S161 for resetting the MU timer to 0, Accordingly, upon another manual code (any of the lock and unlock codes) being received during the manual code priority process, the priority process determined by the existing manual code is canceled.

The immobilizing checkup process at Step S222 (FIG. 12) will be explained in more detail referring to FIG. 13. The immobilizing checkup process starts with Step S230 for determining whether the IMCHK flag for indicating the starting of the immobilizing checkup process is 1 or not. When the immobilizing checkup process is not started and "NO" is given, the procedure moves to Step S235 for setting the immobilizing checkup timer T-IMCHK to a desired immobilizing checkup period (for example, 30 seconds). At Step S236, the IMCHK flag is shifted to 1.

It is then determined at Step S237 whether the EM flag indicative of the emergency mode is 1 or not. Also, it is determined at Step S238 whether the VLK flag indicating that the valet key is withdrawn in the emergency mode is 1 or not. Step S239 follows to determine whether the IGN.SW is switched on or not. When the decisions at the three steps are positive, the procedure advances to Step S240 where the I-E response demand signal is transmitted for identifying the anti-theft code for the valet key. On the contrary, when one of the decisions at Steps S237 to S239 are negative, the procedure is then terminated.

When the immobilizing checkup process has been started and it is judged "YES" at Step S230, the procedure advances to Step S231 for determining whether or not the immobilizing code I sent back from the entry key is identical to the code previously saved in a memory on the vehicle. When so, the procedure goes to Step S232 where the IMOK flag is turned to 1 to indicate the confirmation of the immobilizing code comparison and Step S233 follows. Those steps allow the FI-ECU 33 to positively control the operation of the engine as described previously.

When it is judged "not" at Step S231, the procedure goes to Step S241 to determine whether the EM flag indicating that the entry key is defective is 1 or not. When so, i.e. the entry key is defective, the procedure moves to Step S242 where it is determined whether the I-E code is valid or not. The I-E code is an immobilizing code transmitted from the valet key. When so, the procedure goes to Step S243 to clear off the valet key switching off interruption permitting bit. This is followed by Step S244 where the EM flag is shifted to 0 and then Step S245 where the VLK flag is reset to 0. At Step S245A, the transmission of the I-E response demand signal is canceled. Then, the procedure moves via Step S232 to Steps S233 and S234.

When the decision is negative at either Step S241 or S242, the procedure jumps to Step S246 where it is determined whether the IMCHK timer is timed up or not. When not, the procedure of the immobilizing checkup is terminated. When it is judged "yes" at Step S246, the procedure goes to Step S233. At Step S233, the IMDONE flag indicating that the immobilizing checkup is completed is set to 1 and at Step S234, the IMCHK flag indicative of the start of the immobilizing checkup is shifted to 0 to register the end of the immobilizing checkup.

Figure 14A:
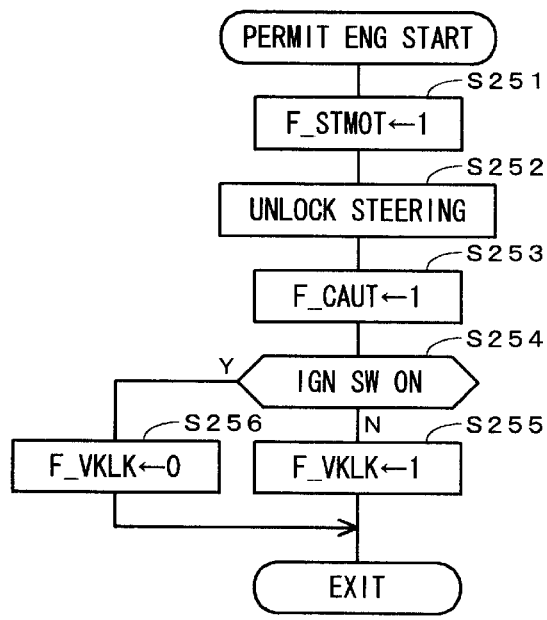
FIGS. 14A and 14B are flowcharts showing in more detail the action of "ENG. start enabling process" and "ENG. action disabling process" of FIG. 4.
Figure 14B:
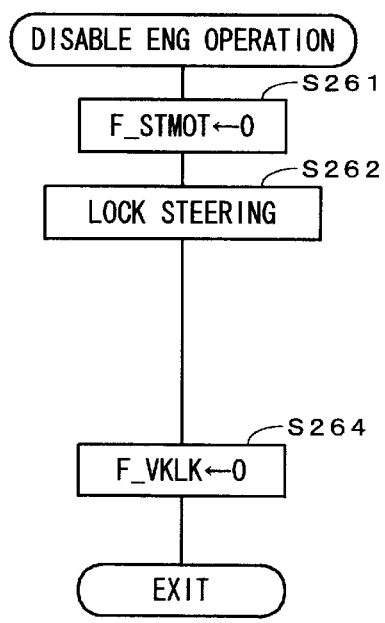

Then, procedures of the engine enabling process at Step S23 and the engine disabling process at Step S24 are now explained referring to FIGS. 14A and 14B respectively.

The engine enabling process starts with Step S251 where the STMOT flag permitting the action of the starter motor and the auto-turn mechanism is shifted to 1 as shown in FIG. 14A when it is judged at Step S22 shown in FIG. 4 that the immobilizing code is valid. This allows the quick-start switch 31 (See FIG. 1) to energize the starter motor. At Step S252, the steering mechanism is unlocked and at Step S253, the CAUT flag is shifted to 1 for enabling the pop-up mechanism for the valet key.

This is followed by Step S254 where it is determined whether the IGN.SW is switched on or not. When so, the VKLK flag for permitting release of the interlocking is turned to 0 at Step S256. More specifically, the release of the interlocking is prohibited before the procedure is terminated. When it is judged "not", the procedure goes to Step S255 where the VKLK flag is shifted to 1 for permitting the release of the interlocking.

The engine disabling process shown in FIG. 14B starts with Step S261 where the STMOT flag is shifted to 0 for inhibiting the action of the starter motor and the auto-turn mechanism. Then, the steering mechanism is locked at Step S262. At Step S264, the VKLK flag is turned to 0 for interlocking the valet key 21 which is thus disallowed to remove from the IGN key cylinder. The settings of the STMOT flag, the CAUT flag, and the VKLK flag are transferred from the smart entry unit 1 to the ignition switch unit 10.

Figure 15:
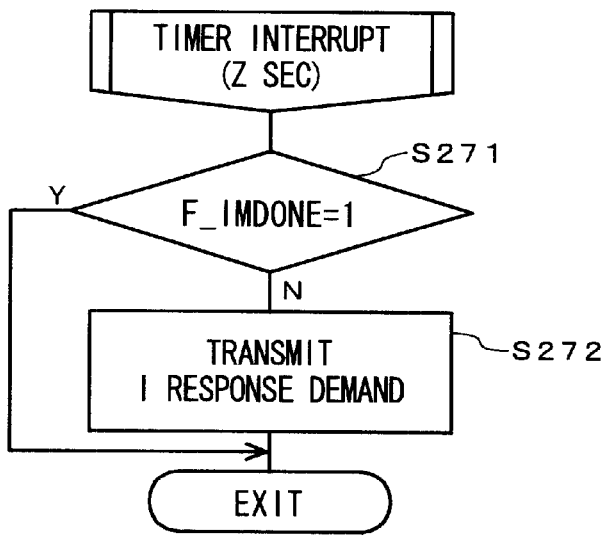
FIG. 15 is a flowchart showing the action of immobilizing start signal transmission process.

FIG. 15 illustrates the intermittent transmission of the I response demand signal with the timer interruption permitting bit for the I response demand signal being enabled, where the timer interruption may be carried out in every z seconds. The procedure starts with Step S271 for examining based on the IMDONE flag whether the immobilizing checkup process is done or not. If not, the procedure goes to Step S272 for permitting the transmission of the I response demand signal. When the immobilizing checkup process has been done and it is judged "YES" at Step S271, the procedure is terminated.

Figure 16:
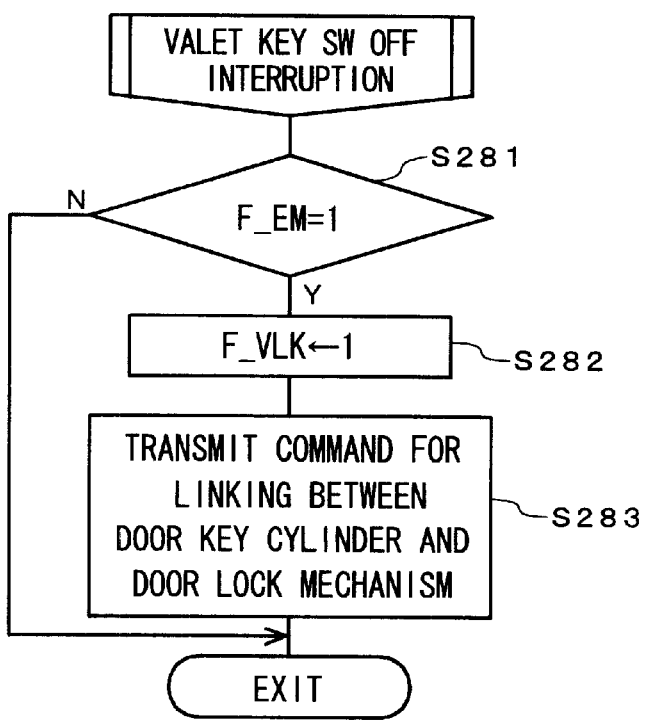
FIG. 16 is a flowchart showing the action of valet key switching off interruption process.

FIG. 16 illustrates a procedure after the valet key switching off interruption permitting bit is set on at Step S150 shown in FIG. 9. The procedure involves an interruption action for the valet key switching off when the valet key has been withdrawn. It is first determined at Step S281 whether the EM emergency flag is 1 or not. When so, the procedure goes to Step S282 for shifting the VLK flag to 1 and Step S283 for mechanically linking the door key cylinder with the door lock mechanism. When it is judged "not" at Step S281, the procedure is terminated. Accordingly, only when the alarm indicating that the entry key is defective is issued and the valet key is withdrawn from the key cylinder, the door key cylinder and the door lock mechanism can mechanically be linked to each other. In case that the valet key remains inserted with the alarm indicating that the entry key is defective, the linking is not executed hence improving the protection against theft.

Figure 18A:
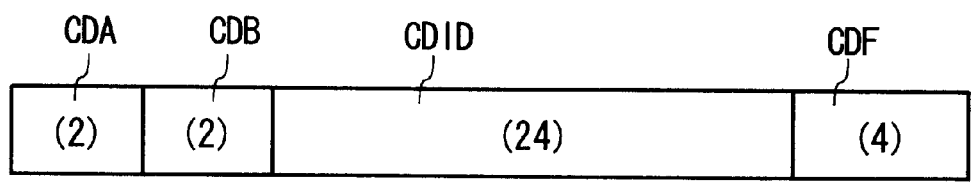
FIGS. 18A and 18B are diagrams showing the code format of a code signal transmitted from the entry key.

FIG. 18A is a diagram showing a code format of the code signal released from the entry key, which is preferably employed in the embodiment. The code signal is a general term including the response signal transmitted by the entry key in response to the response demand signal and the manual code transmitted by the manual switch of the entry key manually switched on. In the figure, CDA is a start bit, CDB is an identification code, CDID is an ID code dedicated to the vehicle, CDF is a function code, and the figures in the parentheses are the number of bits. Basically, the ID code is used for determining whether the entry key is an authentic one or not and the function code is used for discriminating between the A code (a search code) and the B code (a door lock controlling basic code). Assuming that the function code consists of four bits, the A code may be expressed by 1000, the B code by 1001, the manual lock code by 1100, and the manual unlock code by 1101.

Figure 18B:
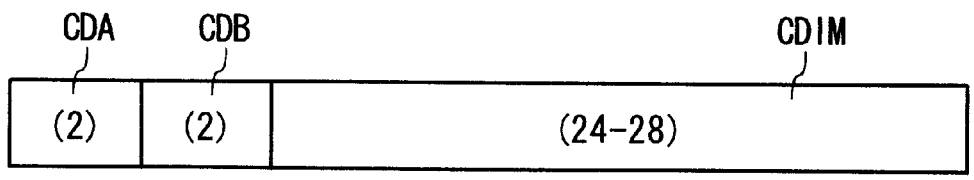

FIG. 18B is a diagram showing a format of the response signal (containing the I code and the I-E code) for immobilizing (for protection against theft), which is preferably employed in the embodiment. As well known, the identification of the immobilizing checkup code is very important for the protection against theft. It is hence desired to have the immobilizing checkup code arranged different in the structure from the other codes. In the figure, CDA is a start bit, CDB is an identification code, and CDIM is an immobilizing ID code. It is also possible that without using the immobilizing ID code, the immobilizing response signal code may be identified by the same action of the function code unit as with the A code or B code.

Although the embodiment are described in relation to the electronic key system having a welcome function with the search code and the basic control code as the response signals, it may successfully be implemented with a like system disclosed in Japanese Patent Laid-open Publication (Heisei)5-106376 or any commonly available electronic key system such as a so-called keyless entry system.

Figure 19:
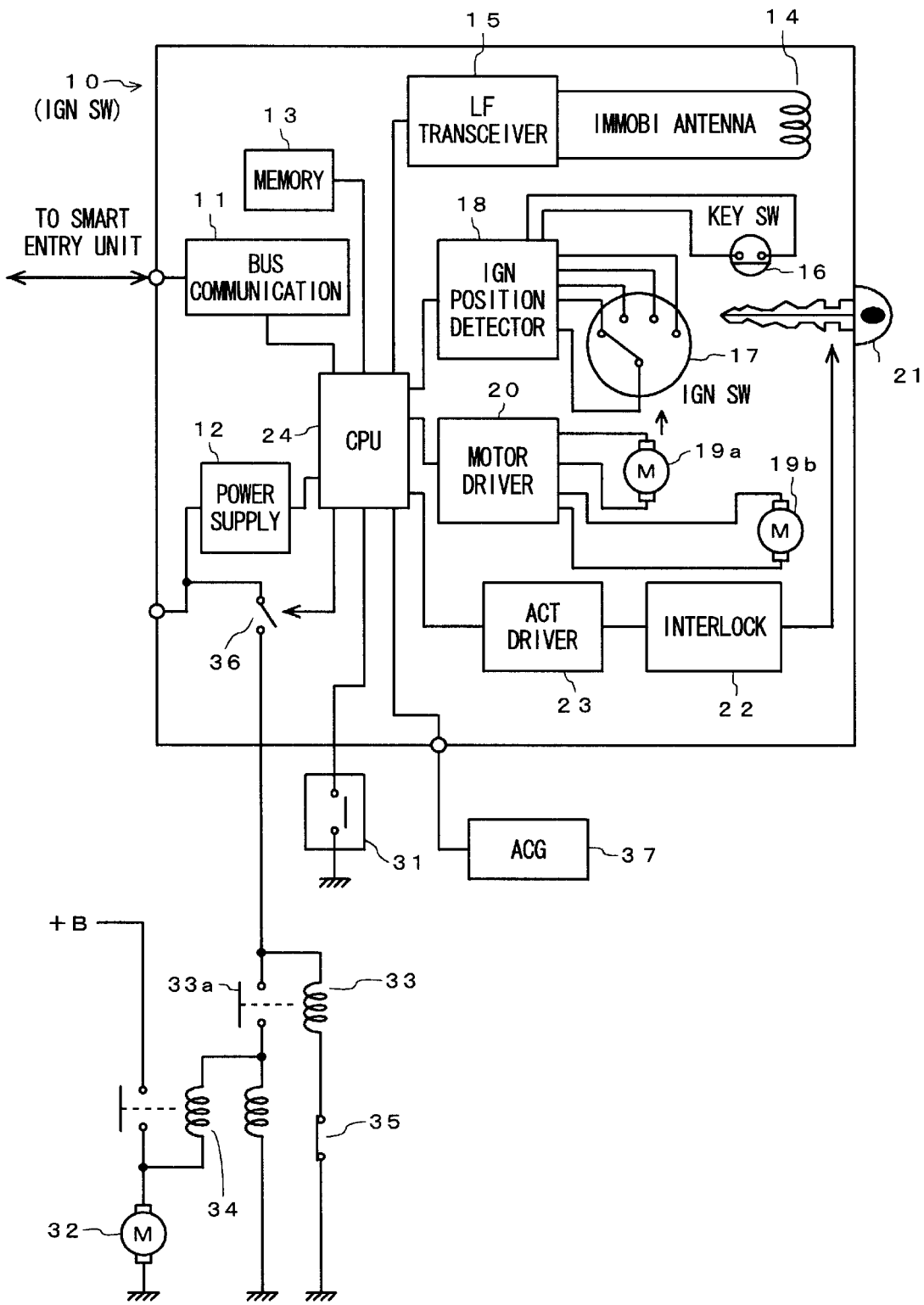
FIG. 19 is a block diagram showing an arrangement of an ignition switch unit as a primary part of the present invention.

FIG. 19 is a block diagram showing an arrangement of the ignition switch unit for a vehicle in the embodiment of the present invention. Like or similar components are denoted by like numerals as those in FIG. 1.

The ignition SW unit 10 comprises a bus communication circuit 11 for exchanging signals via the communication line 32 with the smart entry unit 1, a power supply circuit 12, a memory circuit 13, an immobilizing (anti-thief functioning) antenna 14, a low frequency (LF) transmitter/receiver circuit 15, a key SW 16 for detecting the insertion/extraction of a key, an ignition (IGN) SW 17, an IGN position detector 18 for detecting the contact position of the IGN SW 17, a motor 19a for actuating a rotary contact of the IGN SW 17, a motor 19b for retracting or popping up a key cylinder 17a, a motor driver 20 for driving the motor 19a and 19b, a valet (or auxiliary or emergency) key 21 which is inserted and extracted to and from the key cylinder, an interlock ACT (actuator) 22 for prohibiting the removal (or extraction) of the valet key 21, an ACT driver 23 for driving the interlock ACT 22, and a CPU 24 for controlling the actions of the above-mentioned components.

The CPU 24 is connected with a quick-start switch 31 for starting the engine and a driver circuit (including relays 33 and 34 and a switch 36) for driving a starter motor 32. There are also provided an A/T gear position switch 35 which is closed when the gear shift lever is in the parking position and an ACG (alternator) 37.

Figure 20:
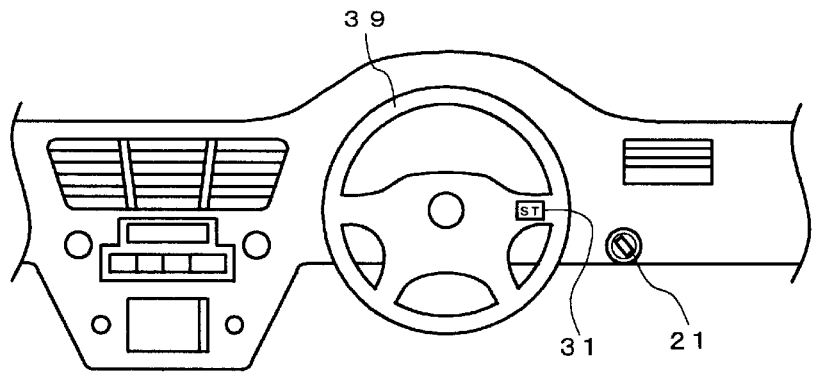
FIG. 20 is a schematic view showing a region about the steering wheel of the vehicle.

FIG. 20 illustrates a front panel of the vehicle seen from the driver seat. The quick-start switch 31 is mounted to a region of a steering handle 39 and on the right of the steering handle 39 at the front panel is the key cylinder to which the valet key 21 is inserted. The ignition switch 17 with the valet key 21 inserted in the ignition key cylinder serves as a rotary switch. The valet key 21 serves as a manually operable knob and will be referred to as a manually operated knob 21 hereinafter.

The manually operated knob 21 holds a second code which is different from the code saved in the entry key and used with the vehicle remote control system. As the manually operated knob 21 is inserted into the key cylinder, it allows the second code to be read out through the immobilizing antenna 14 (See FIGS. 19 and 21B described later) mounted on the outer surface of the key cylinder. The manually operated knob 21 may hold the same code as saved in the entry key.

Figure 21A:
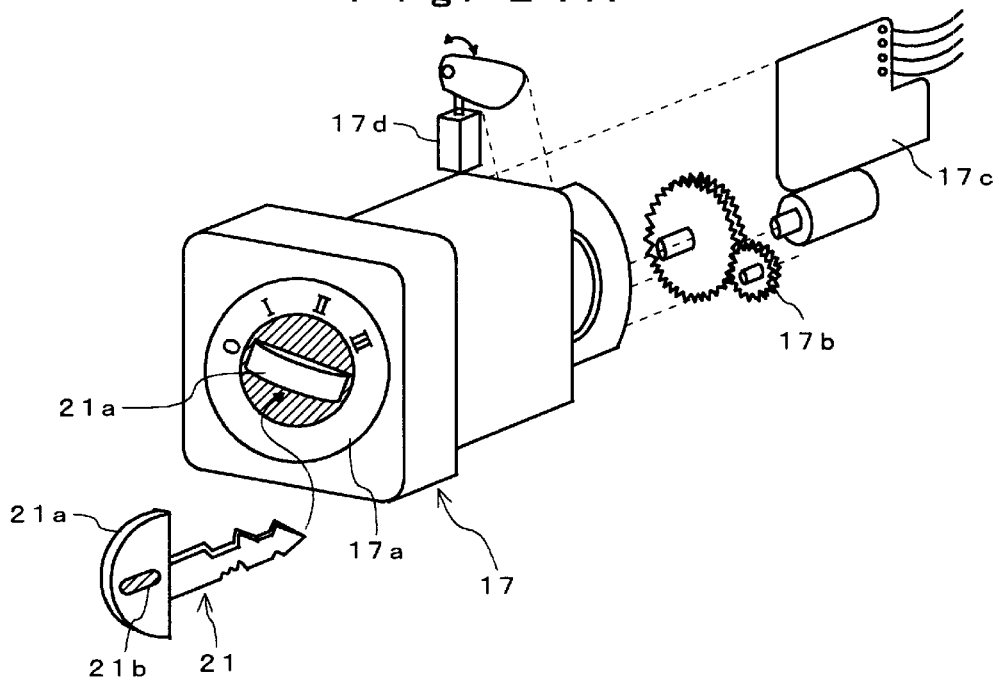
FIGS. 21A and 21B are exploded perspective views showing a manually operated knob and a key cylinder.
Figure 21B:
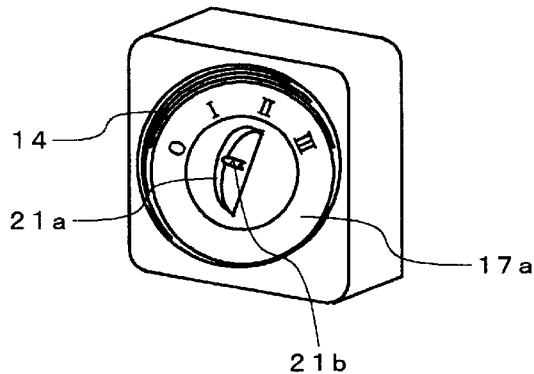

FIG. 21A is a perspective view showing the manually operated knob 21 and the ignition switch 17. FIG. 21B illustrates an arrangement of the immobilizing antenna 14 with the manually operated knob 21.

The manually operated knob 21 has a head 21a provided at the top thereof and a transponder (a code transmitter) 21b mounted on the head 21a. The ignition switch 17 includes a key cylinder 17a thereof having a key insertion opening not shown. Markings 0, I, II, and III are provided about the key insertion opening. The markings correspond to the LOCK, ACC, ON, and START positions of the ignition switch 17 respectively. The ignition switch 17 also includes an auto-turn mechanism 17b, a printed circuit board 17c for controlling the signal transmission and the switch movements, and an interlocking and rotation protective mechanism 17d. In addition, as best shown in FIG. 21B, the immobilizing antenna 14 is mounted on the inner wall of the ignition switch 17 to be opposite to the key cylinder 17a.

Figure 22:
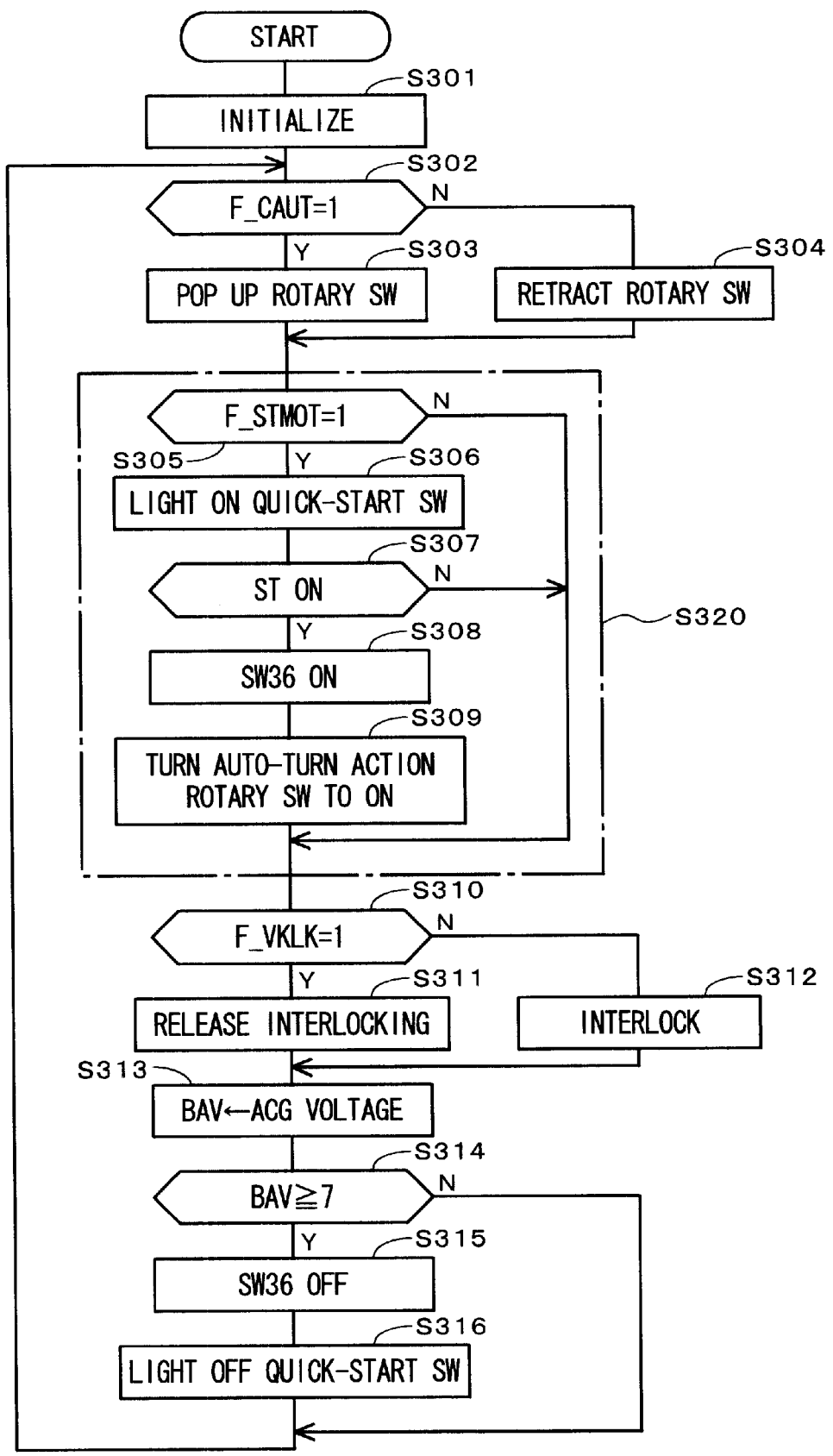
FIG. 22 is a flowchart showing a procedure of actions of the ignition switch unit.

The action of the ignition switch unit 10 will be described referring to the flowchart of FIG. 22. The flowchart of FIG. 22 illustrates a procedure of actions of the ignition switch unit 10. The ignition switch unit 10 functions in parallel to the action of the smart entry unit 1.

First, the procedure which starts with the user or driver embarking and starting the engine will be explained. More specifically, the driver walks from far to close to the vehicle and opens the door of the vehicle to embark. Once the door is closed after embarking, the action follows as the decision is negative at Step S2 shown in FIG. 4 (when the ignition switch remains switched off). When the driver is a valid personnel (having the entry key), the IMOK flag is set to 1 in the immobilizing checkup (Step S232) shown in FIG. 13. Then, it is judged at Step S223 shown in FIG. 12 that the IMOK flag is 1. When the start of the engine is enabled at Step S224, the ignition switch unit 10 is informed by the entry unit 1 that the CAUT flag (for permitting the action of the pop-up mechanism), the STMOT flag (for permitting the action of the starter motor and the auto-turn mechanism), and the VKLK flag (for permitting the release of the interlocking) all are set to 1. The immobilizing checkup (with the immobilizing code) may be replaced by identification of the B code or the manual unlock code for unlocking the door.

As the action of the ignition switch unit 10 starts, its functions are initialized at Step S301 shown in FIG. 22 and Step S302 follows to determine whether or not the CAUT flag permits the action of the pop-up mechanism. Just after the driver embarks, the CAUT flag remains at 1 as described and the procedure goes to Step S303 where the key cylinder 17a or the rotary switch is popped up. This action is conducted by the CPU 24 driving the motor 19b (See FIG. 19).

It is then determined at Step S305 whether the STMOT flag is 1 or not. As the STMOT flag is now 1, the procedure moves to Step S306 for lighting up the action permitting lamp for the quick-start switch. The examination at Step S305 may be made over the IMOK flag instead of the STMOT flag. In case that no immobilizing system is involved, the BREC flag (for identifying the B code) or the manually released door unlock code may be used for the purpose.

Step S307 follows to determine whether the quick-start switch 31 is switched on or not. As the decision is negative in the beginning, the procedure jumps to Step S310 where it is determined whether the VKLK flag is 1 or not. As the VKLK flag is now 1, the procedure goes to Step S311 for releasing the interlocking of the manually operated knob. Accordingly, the manually operated knob can be withdrawn from the ignition switch 17.

This is followed by Step S313 where the battery voltage (BAV) is substituted by the ACG voltage. It is then determined at Step S314 whether or not BAV exceeds, for example, 7 volts (V). As the ACG voltage is zero at the start of the engine, the decision is negative. Then, the procedure returns back to Step S302 for repeating the above actions.

Figure 25:
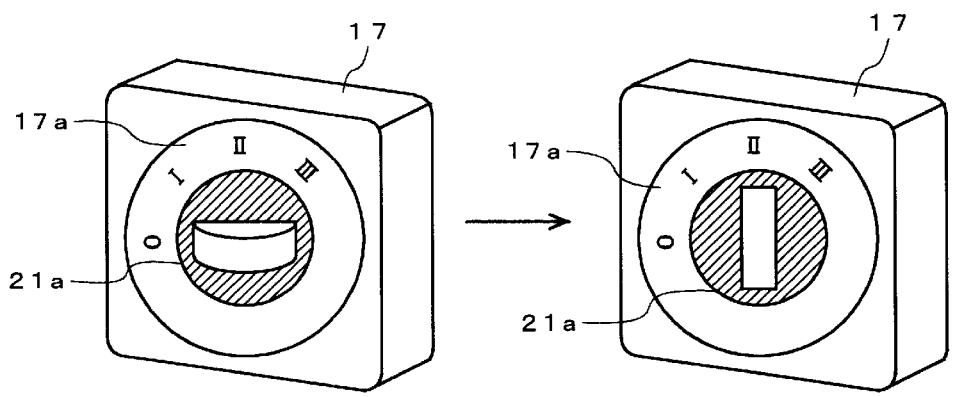
FIG. 25 is a view showing turning movement of the manually operated knob for automatically starting the engine.

Once the quick-start switch 31 is switched on, the decision at Step S307 becomes positive and the procedure goes to Step S308 for turning on the switch 36 shown in FIG. 19. At Step S309, the auto-turn action rotary switch is turned from the 0 position to the II position (the ON position) (See FIG. 25). This action is conducted by the CPU 24 of FIG. 19 supplying the motor driver 20 with the drive signal to actuate the motor 19a. The motor driver and the motor 19a work as the auto-turn mechanism.

Figure 23:
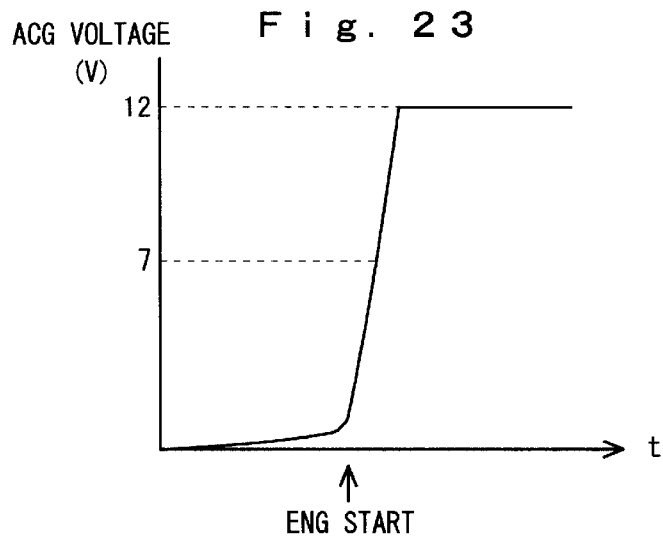
FIG. 23 is a diagram showing a change in the ACG voltage at the start of the engine.

As the ignition switch is switched on, the decision at Step S254 (FIG. 14A) becomes positive and the VKLK flag is shifted to 0 at Step S256. This allows Step S310 to judge negative and then, the manually operated knob is interlocked at Step S312. Then, the engine starts running (by itself) and sharply increases the ACG voltage to 12 V. As the decision at Step S314 becomes positive, the switch 36 is turned off at Step S315 to stop the action of the starter motor 32 and the action permitting lamp for the quick-starter switch is lit off at Step S316. The ACG voltage remains at 0 V while the engine is not running, but it rises up to 12 V instantly when the engine is started as shown in FIG. 23.

The above actions are now explained in a sequence referring to FIG. 19. When the CPU 24 recognizes that the quick-start switch 31 is switched on, it delivers a command signal to close the switch 36. As the A/T gear position switch 35 remains closed, a current flows across the relay 33. The relay 33 is then turned on closing the switch 33a. This actuates the relay 34 to energize the starter motor 32. The CPU 24 monitors the voltage at the ACG (alternator) 37 and when detecting a change in the voltage, determines that the engine is started. Upon detecting the voltage change, for example to 7 V, the CPU 24 turns off the switch 36 to stop the action of the starter motor 32.

The decision at Step S307 may involve determining whether or not the ignition switch is turned to the III position (the START position in a manual mode) instead of examining the state of the quick-start switch 31. The action of the manually operated knob in that case is illustrated in FIG. 26A. As shown, the manually operated knob 21 is turned from the 0 (off) position to the I (ACC) position, the II (ON) position, and the III (START) position and when its turning action by hand is canceled on the engine starting, automatically returns back to the II position.

For stopping the engine of the vehicle, the driver turns the manually operated knob 21 from the II position to the 0 position with its head 21a held by the fingers (for switching off the ignitions witch 31) thus to stop the engine. During the actions, the procedure goes from Steps S143 and S143A shown in FIG. 9 to Step S232 shown in FIG. 13 and Step S224 shown in FIG. 12, and it is then judged "not" at Step S254 (See FIG. 14A). As the VKLK flag is set to 1, the decision at Step S310 becomes positive and the interlocking is canceled at Step S311. This allows the manually operated knob to be withdrawn from the ignition switch 17. The cancellation of the interlocking is executed by the CPU 24 of FIG. 19 directing the ACT driver 23 to actuate the interlock ACT 22.

According to the embodiment of the present invention, it is essential for stopping the engine of the vehicle to manually turn the manually operated knob 21 or the rotary switch from the ON position to the OFF position. More particularly, a known mechanical action as with the conventional ignition key switch is necessary hence improving the operability of the system while the user or driver having no unfamiliar feeling. Also, only when the I code from the entry key is identified and valid and simultaneously the rotary switch remains in the action disabling position for the system, the manually operated knob can be withdrawn from the rotary switch.

When the door at the driver side is opened and then closed and locked with its key, the CAUT flag and the VKLK flag are turned to 0 at Step S178 (FIG. 11). As the decision at Step S310 becomes negative, the procedure goes to Step S312 where the manually operated knob is interlocked. As the decision at Step S302 becomes negative, the procedure moves to Step S304 for retracting the rotary switch. When the manually operated knob 21 remains inserted into the ignition switch 17, it retracts within the ignition switch 17 and a cover 47 (See FIG. 27 described later) is then closed. This allows no wicked personnel to criminally access and turn the manually operated knob after successfully opening the door and entering into the vehicle, thus preventing the key cylinder 17a from being injured and broken down.

Figure 24:
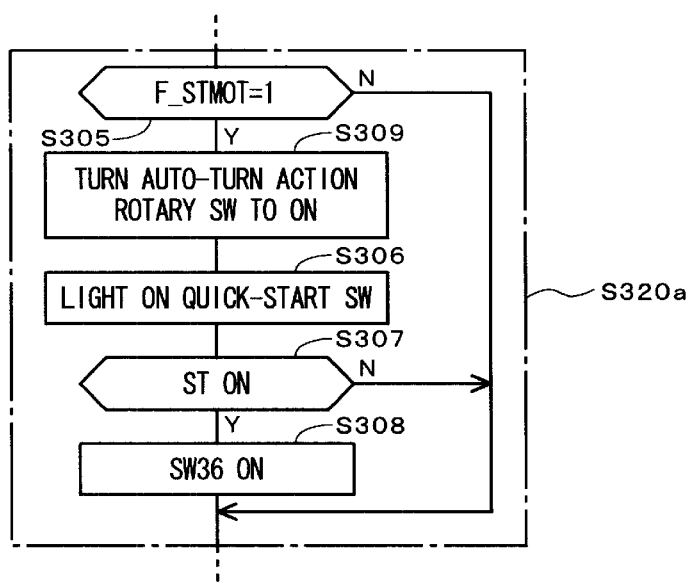
FIG. 24 is a flowchart showing a procedure of actions of a modification of the arrangement shown in FIGS. 21A and 21B.

The action at Step S320 marked with the chain line in FIG. 22 may be replaced by such a modification as shown in Step S320a in FIG. 24. This modification permits the action at Step S309 of turning the auto-turn action rotary switch to the ON position provided after Step S305. Accordingly, after the rotary switch is turned to the ON position at Step S309, the action stands by until the starter switch is switched on at Step S307. More specifically, when the driver embarks, the rotary switch is automatically turned to the ON position. This will make the action of starting the engine more simpler than that shown in FIG. 22 and also minimize the period required for the action.

The action of the manually operated knob 21 in case of the entry key has a fault will be described. As the manually operated knob 21 is turned from the II position to the 0 position by the driver manipulating its head 21a (the ignition switch turned off), the decision at Step S2 (FIG. 4) becomes negative and the refresh one process at Step S3 initializes the immobilizing flag for the immobilizing system and the EM flag for the emergency mode (=0). This is followed by the fault detection at Step S4.

As already described referring to FIG. 9, the fault detection starts with Steps S141, S142, and S142A where the decision is negative. Then, the procedure goes to Step S143 for setting on the I response demand signal transmission timer interruption permitting bit. At Step S143A, the immobilizing checkup is carried out. As the decision at Step S230 shown in FIG. 13 becomes negative, the immobilizing checkup time setting timer is set to, for example, 30 seconds at Step S235. Step S236 follows where the IMCHK flag is shifted to 1 for starting the immobilizing checkup and the process of the immobilizing checkup is terminated. The procedure further advances to Step S144 shown in FIG. 9. At Step S144, the ISR flag indicating the fault detection being under way is turned to 1 and the process of the fault detection is terminated. The procedure then goes to Step S5 (FIG. 4).

As it is judged "yes" at Step S5 and "not" at Step S6, the procedure moves to Step S9. When it is judged negative at Steps S9 and S10, Step S14 follows for examining the code reception. As it is assumed that the entry has a fault, the ID code from the entry key is not received and the decision at Step S14 becomes negative. Then, the procedure moves to Step S15A where it is judged that the IMCHK flag is 1. This is followed by Step S16A for carrying out the immobilizing checkup.

Figure 13:
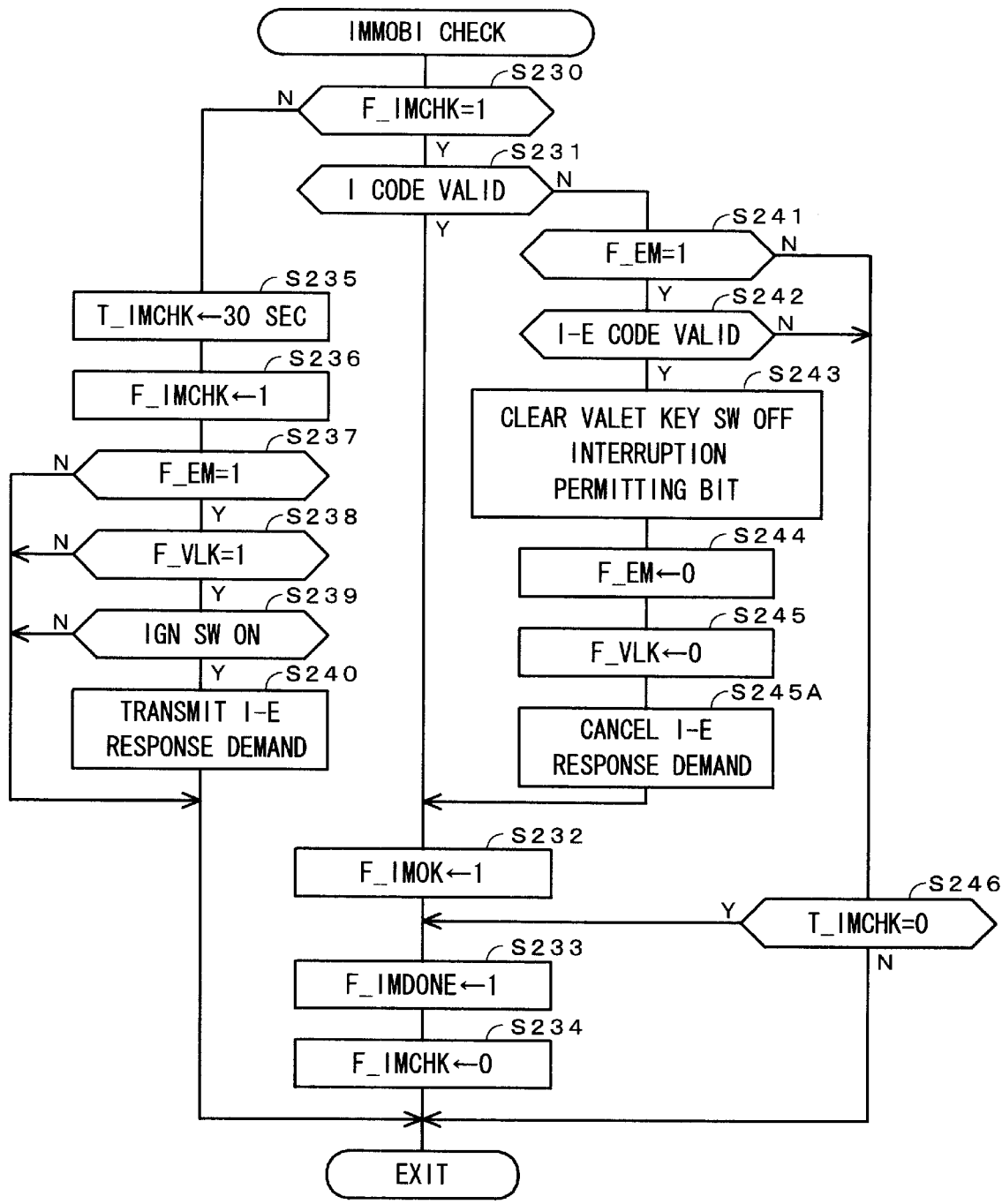
FIG. 13 is a flowchart showing in more detail the action of "immobilizing checkup process" of FIG. 4.

As shown in FIG. 13, the immobilizing checkup starts with Step S230 where it is judged positive. The procedure then goes to Step S231 to determine whether or not the I code (an immobilizing code) received from the entry key is identical to that stored in the memory circuit at the vehicle side. It is judged "not" because the entry key is defective, the procedure goes to Step S241 where it is determined whether the EM flag indicative of the emergency mode is 1 or not. As the EM flag is 0, the decision is negative. The procedure moves to Step S246 for determining whether the immobilizing checkup time setting timer set with 30 seconds is timed up (=0) or not. The actions are repeated until the decision at Step S246 becomes positive.

When the immobilizing checkup timer setting timer is timed up, the decision at Step S246 becomes positive and the procedure goes to Step S233 where the IMDONE flag indicating that the immobilizing checkup is completed is shifted to 1. Then, the IMCHK flag is turned to 0 at Step S234 and the procedure of the immobilizing checkup is terminated.

After the immobilizing checkup is finished at Step S16A, the procedure returns to the fault detection at Step S4. As the IMDONE flag is shifted to 1, the decision at Step S142 shown in FIG. 9 becomes positive. When the I response demand signal transmission timer interruption permitting bit is cleared off at Step S145, the procedure goes to Step S146. As the IMOK flag indicating the result of the immobilizing checkup is 0, the decision at Step S146 becomes negative and the procedure goes to Step S147 to determine whether the IMBF flag indicating the result of the preceding immobilizing checkup is 1 or not. As the IMBF flag is assigned at Step S102 of the refresh one process (FIG. 7) indicating the positive result and the decision at Step S147 is positive. Accordingly, it is judged that the entry key has a fault but neither theft nor vandalism is involved.

At Step S148, the EM flag is shifted to 1 indicating that the entry key has a fault and the emergency mode is called. At Step S149, the alarm indicating that the entry key is defective is issued and the VKLK flag is shifted to 1 for releasing the interlocking of the manually operated knob. At Step S150, the valet key switching off permitting bit is set on. Accordingly, when the manually operated knob is withdrawn from the ignition key cylinder, the valet key switching off interruption shown in FIG. 16 is carried out.

At Step S282 of the interruption, the VLK flag is shifted to 1 indicating that the manually operated knob is withdrawn. Step S283 then follows where a command for mechanically linking the door key cylinder with the door lock mechanism is transferred to a door control unit not shown.

Returning to Step S151 shown in FIG. 9, the SRCH flag is shifted to 1 indicating that the fault detection is completed and the ISR flag indicating the fault detection is turned to 0. Then, the procedure of the fault detection is terminated. This is followed by Step S15A (FIG. 4) where the decision is negative and a loop of the actions including Steps S30 and S41 shown in FIG. 5 are then repeated. It is clearly understood that the fault detection at Step S4 in the loop is now skipped.

As described, once it is judged that the entry key has a fault and the manually operated knob is withdrawn, the door key cylinder and the door lock mechanism are mechanically linked to each other. This allows the driver to lock and unlock the door through simply operating the manually operated knob. If the manually operated knob remains not withdrawn with the entry key found defective, it prevents the mechanical linkage between the door key cylinder and the door lock mechanism hence improving the protection against vehicle theft.

When the manually operated knob is inserted and operated to turn the ignition key cylinder to the II position (the ON position), the decision at Step S2 (FIG. 4) becomes positive and the refresh two process at Step S21 is then carried out. In the refresh two process, while the welcome function related flags are initialized, the SRCH flag indicating that the fault detection is completed is shifted to 0 at Step S127. As the decision at Step S22 (FIG. 4) for determining whether the IMOK flag is 1 or not is negative by now, the action of the engine is disabled at Step S24. Step S25 follows for determining whether the IMDONE flag indicating the immobilizing checkup is completed is 1 or not. At the time, this decision is negative and the actions at Steps S26 and S27 are then carried out.

The immobilizing checkup at Step S27 starts with Step S230 shown in FIG. 13. As it is judged "not" at Step S230, the procedure goes to Step S235 and S236. Then, the decisions are made at Steps S237, S238, and S239. As those decisions are now positive, the I-E response demand signal is transmitted at Step S240 for requesting the receipt of the immobilizing code for the manually operated knob. After the immobilizing checkup is completed, the procedure returns back to Step S2 shown in FIG. 4.

This time, the refresh two process at Step S2 is skipped and the procedure goes to Step S22. As the decision at Step S22 is negative, the procedure moves via Step S24 to Step S25. So far, the IMDONE flag is 0, the procedure further goes to Step S26 and Step S27 where the immobilizing checkup is carried out. This time, the decision at Step S230 of FIG. 13 becomes positive and Step S231 follows for determining whether the I code for immobilizing is valid or not. Since the entry key is now defective, the I code is not valid. As the decision at Step S231 is negative, the procedure jumps to Step S241.

It is judged at Step S241 that the EM flag is 1. As the code of the manually operated knob is authentic, it is valid at Step S242 (as judged "yes") and the procedure goes to Steps S243, S244, S245, and S245A. The manually operated knob switching off interruption permitting bit is cleared off at Step S243, the EM flag is turned to 0 at Step S244, the VLK flag is turned to 0 at Step S245, and the transmission of the I-E response demand signal is canceled at Step S245A.

Then, the IMOK flag is shifted to 1 at Step S232 indicating the result of the immobilizing checkup, the IMDONE flag is shifted to 1 at Step S233 indicating that the immobilizing checkup is completed, and the IMCHK flag indicating the start of the immobilizing checkup is turned to 0 at Step S234. The procedure of the immobilizing checkup is then terminated.

This is followed by Step S22 (FIG. 44) of which the decision is now positive. Step S23 thus follows for enabling the start of the engine, where both the STMOT flag and the VKLK flag are shifted to 1 as described previously referring to FIG. 14A. As the decision at Step S25 is positive, the I response demand signal transmission timer interruption permitting bit is cleared off at Step S28. While the manually operated knob remains at the II position (the ON position), the above actions are repeated.

In parallel to the above actions, the ignition switch unit 10 performs the procedure shown in FIG. 22. Accordingly, as apparent from the foregoing description, the engine can be started by the driver switching on the quick-start switch at Step S307 or manually turning the manually operated knob to the III position (the START position).

As set forth above, the present invention allows the manually operated knob to be used, when the entry key has a fault, for starting and stopping the engine, and locking and unlocking the door(s) of a vehicle, provided that the manually operated knob is once withdrawn from the ignition key cylinder and the fault of the entry key is detected by the user or driver. Accordingly, the key system of the present invention can be increased in the utility and improved in the protection against theft.

Figure 27:
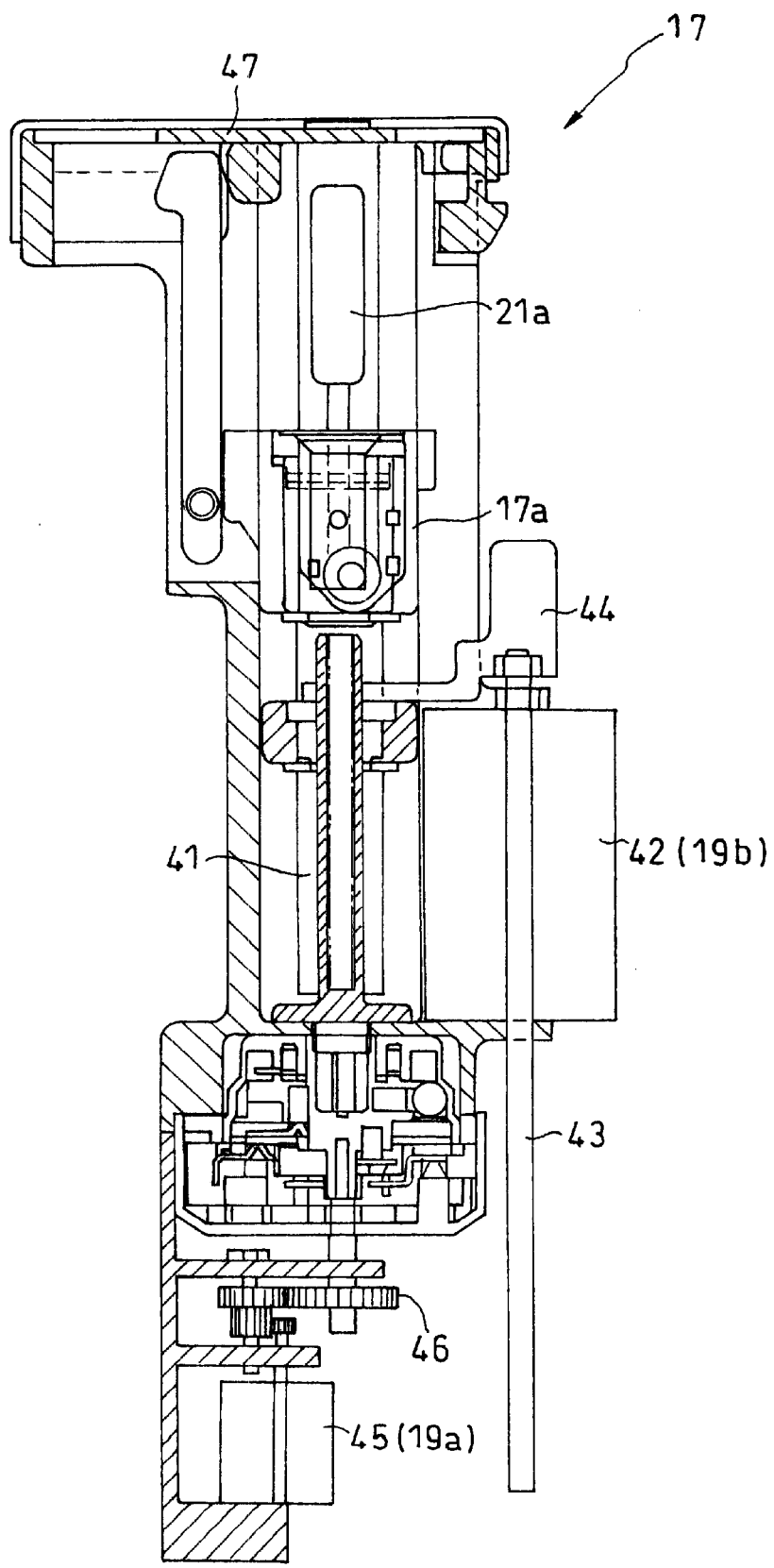
FIG. 27 is a cross sectional view showing a mechanism for accommodating the manually operated knob.
Figure 28:
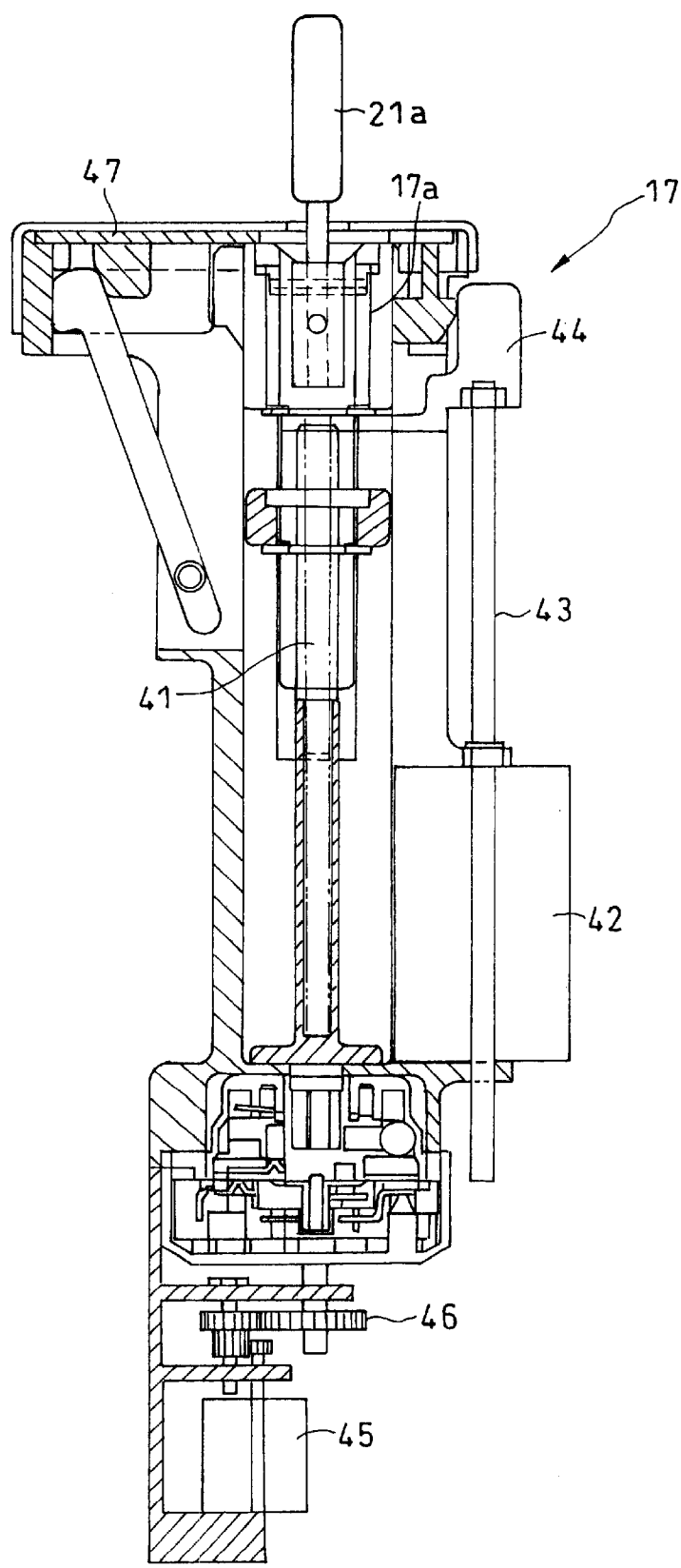
FIG. 28 is a cross sectional view showing a mechanism for popping up the manually operated knob.
Figure 29:
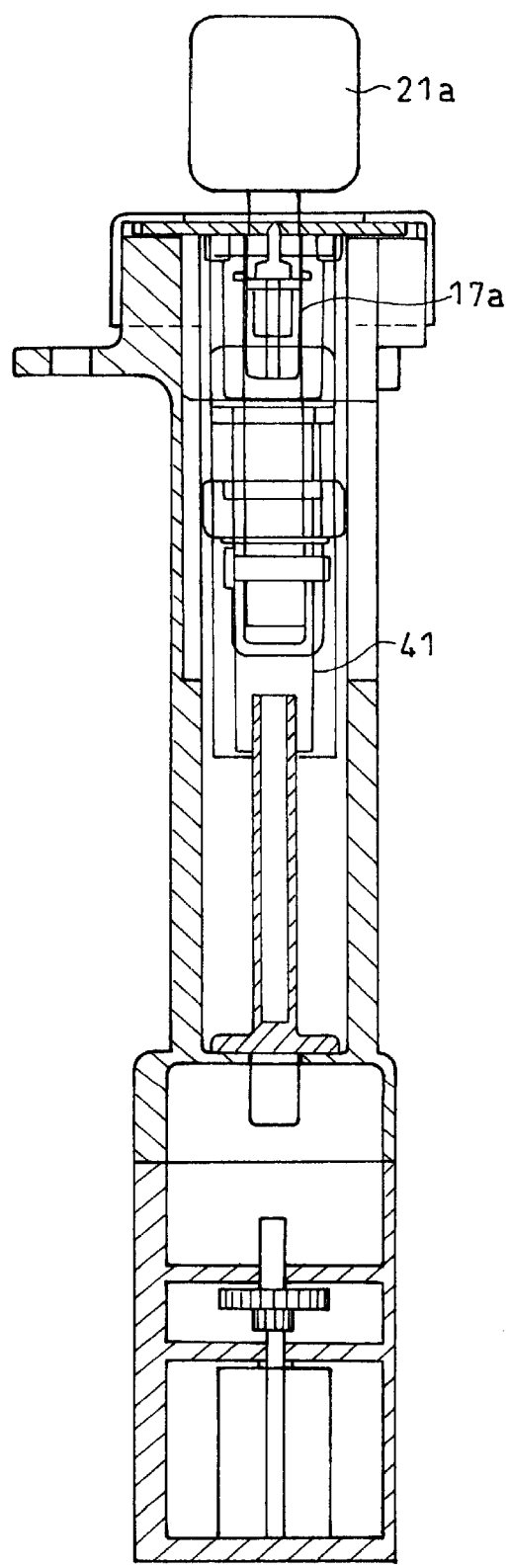
FIG. 29 is a side view similar to FIG. 28 seen from the left.

The pop-up and accommodation mechanism of the rotary switch 17 will now be described in more detail referring to FIGS. 27, 28, and 29. FIGS. 27, 28, and 29 are cross sectional views of the pop-up mechanism of the rotary switch 17. More specifically, FIG. 27 illustrates a retracted state of the rotary switch 17, FIG. 28 illustrates a pop-up state of the rotary switch 17, and FIG. 29 illustrates the same of FIG. 28 seen from the left side.

As shown, the key cylinder 17a is fixedly mounted to the distal end of a vertically movable shaft 41 of the ignition switch 17. The drive shaft 43 of a motor 42 (19b in FIG. 19) has a thread provided thereon for mechanically joining by a collar 44 or the like to the shaft 41. As the motor 42 rotates, the drive shaft 43 travels vertically thus driving the shaft 41 in the same direction. When the shaft 41 is moved upward, the key cylinder 17a comes in its pop-up state with the head 21a of the manually operated knob 21 projecting to the outside. When the shaft 41 is moved downward, the key cylinder 17a retracts and the manually operated knob 21 is accommodated therein. As an auto-turn action motor 45 (19a) runs, a toothed wheel 46 joined to the shaft of the motor 45 is rotated to automatically turn the key cylinder 17a from the 0 position to the II position. The cover 47 is closed upon the key cylinder 17a retracting and open at the pop-up action.

The embodiment is described with the action of the auto-turn mechanism for turning the rotary switch triggered by identification of the I code for enabling the action of the engine. The action of the auto-turn mechanism may be enabled by identification of the code for unlocking the door as is covered within the scope of the present invention. More specifically, the B code or the manual unlock code may be utilized for enabling the action. The unlock code for a common keyless entry system may also be used with equal success.

As set forth above, the present invention permits the engine of a vehicle to be started by simply pressing the button switch and stopped by manually turning the manually operated knob from the ON position to the OFF position as simulating the familiar mechanical movement of a conventional ignition key. Accordingly, the key system of the present invention can be improved in the operability with giving the user no unfamiliar touch. In addition, the key system like any conventional one can find the energization of its vehicle-mounted counterpart hence hardly interrupting the action of qualification.

Also, while its action of turning the rotary switch controls the movements of the engine and other vehicle-mounted apparatuses, the manually operated knob is arranged detachable from the rotary switch. If the entry key has a fault and becomes defective, it can readily be replaced by the manually operated knob (the valet key 21) which is portable. The manually operated knob (the valet key) can thus be inserted into the rotary switch and turned to the positions for controlling the action of the engine and the other relevant vehicle-mounted apparatuses. As a result, the manually operated knob can serve as a conventional ignition key in any emergency case, hence increasing the utility of the key system.

Moreover, the manually operated knob when is kept in the vehicle can be addressed inwardly and accommodated deep in the key cylinder. This prevents the manually operated knob from being accessed by any other personnel and can hence improve the protection against vehicle theft.

What is claimed is:

1. An electronic key system for a vehicle arranged to control the action of vehicle-mounted apparatuses through code identification based on radio communications with a portable electronic key, comprising:
   a means for determining whether the code identification is valid or not;
   a start switch operated to be turned on for starting an engine of the vehicle when the determining means determines that the code identification is valid;
   a rotary switch provided with a manually operated knob and arranged for controlling the action of vehicle-mounted apparatuses according to the position of the rotary switch; and
   an auto-turn mechanism arranged to automatically turn the rotary switch together with the manually operated knob to a position for enabling the action of the vehicle-mounted apparatuses when the code identification is valid.

2. An electronic key system for a vehicle according to claim 1, further comprising:
   a mechanism for physically locking the manually operated knob for the rotary switch, wherein when the rotary switch is held to the position for disabling the action of the vehicle-mounted apparatuses and the code identification is valid, the manually operated knob is unlocked and separated from the rotary switch.

3. An electronic key system for a vehicle according to claim 1, wherein the manually operated knob has a transmitter for transmitting a second code; said electronic key system further comprising:
   a receiver for receiving the second code, wherein a combination of the identification of the second code and the turning action of the manually operated knob can enable the action of the vehicle-mounted apparatuses.

4. An electronic key system for a vehicle according to claim 1, further comprising:
   a parking state detecting means for detecting a parking state of the vehicle; and
   a retracting mechanism for retracting the manually operated knob inwardly of a key cylinder of the rotary switch, wherein the manually operated knob can be released from the retracting mechanism and projected from the key cylinder when the code identification is valid and can be retracted inwardly of the key cylinder by the action of the retracting mechanism when the engine stops and the parking state is detected.

5. An electronic key system for a vehicle arranged to control the action of vehicle-mounted apparatuses through code identification based on radio communications with a portable electronic key, comprising:
   a means for determining whether the code identification is valid or not;
   a start switch operated to be turned on for starting an engine of the vehicle when the determining means determines that the code identification is valid;
   a rotary switch provided with a manually operated knob and arranged for controlling the action of vehicle-mounted apparatuses according to the position of the rotary switch; and
   an auto-turn mechanism arranged to automatically turn the rotary switch to a position for enabling the action of the vehicle-mounted apparatuses when the code identification is valid and the start switch is turned on.

6. An electronic key system for a vehicle according to claim 5, further comprising:
   a mechanism for physically locking the manually operated knob for the rotary switch, wherein when the rotary switch is held to the position for disabling the action of the vehicle-mounted apparatuses and the code identification is valid, the manually operated knob is unlocked and separated from the rotary switch.

7. An electronic key system for a vehicle according to claim 5, wherein the manually operated knob has a transmitter for transmitting a second code; said electronic key system further comprising:
   a receiver for receiving the second code, wherein a combination of the identification of the second code and the turning action of the manually operated knob can enable the action of the vehicle-mounted apparatuses.

8. An electronic key system for a vehicle according to claim 5, further comprising:

a parking state detecting means for detecting a parking state of the vehicle; and a retracting mechanism for retracting the manually operated knob inwardly of a key cylinder of the rotary switch, wherein the manually operated knob can be released from the retracting mechanism and projected from the key cylinder when the code identification is valid and can be retracted inwardly of the key cylinder by the action of the retracting mechanism when the engine stops and the parking state is detected.

* * * * *